Nov. 3, 1964   R. A. HEMPEL   3,155,836
ELECTRONIC COUNTER CIRCUIT SELECTIVELY RESPONSIVE TO
INPUT PULSES FOR FORWARD OR REVERSE
Filed July 27, 1959   11 Sheets-Sheet 2
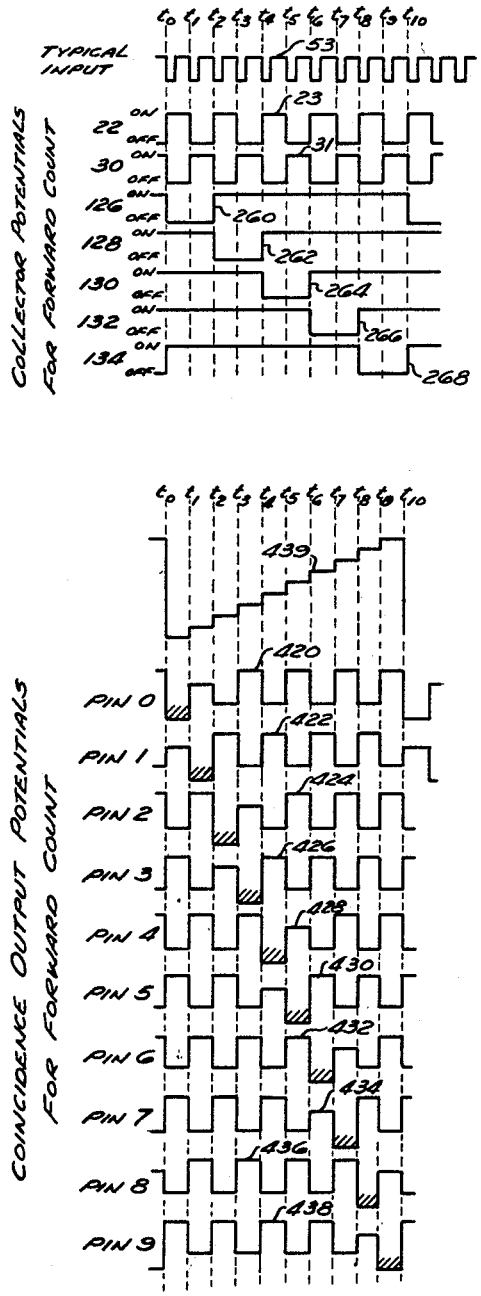
Fig. 2
Fig. 3
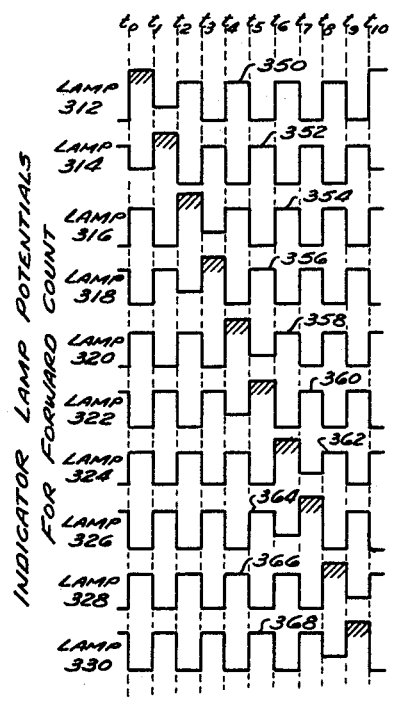
Fig. 4
INVENTOR.
ROY A. HEMPEL
BY Karl A. Ohralik
ATTORNEY Nov. 3, 1964  R. A. HEMPEL  3,155,836
ELECTRONIC COUNTER CIRCUIT SELECTIVELY RESPONSIVE TO
INPUT PULSES FOR FORWARD OR REVERSE
Filed July 27, 1959  11 Sheets-Sheet 3

INVENTOR.
ROY A. HEMPEL
BY Karl A. Ohralik
ATTORNEY

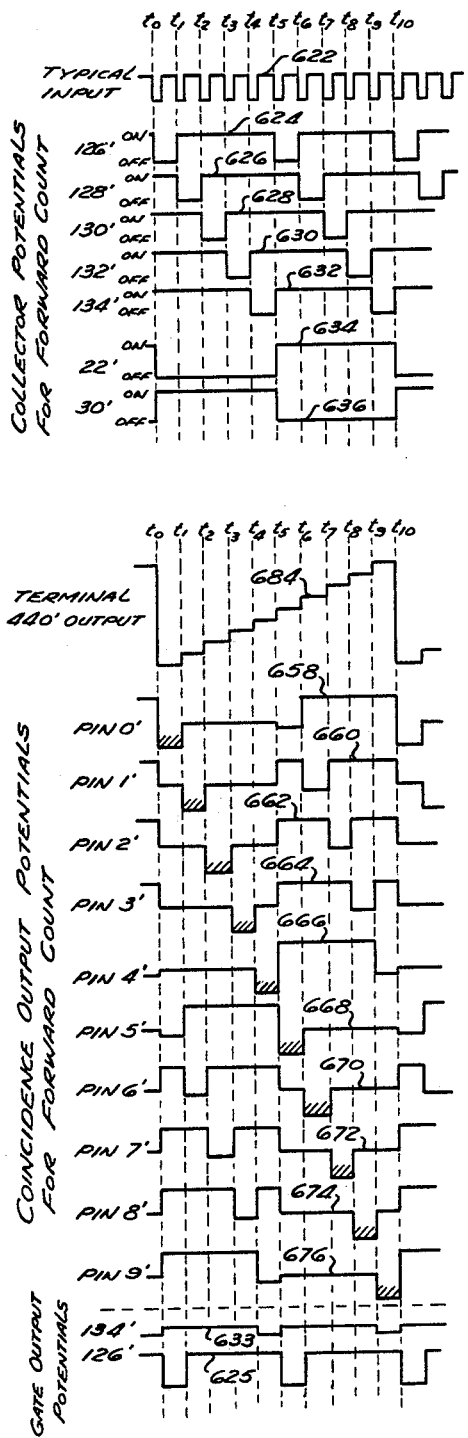
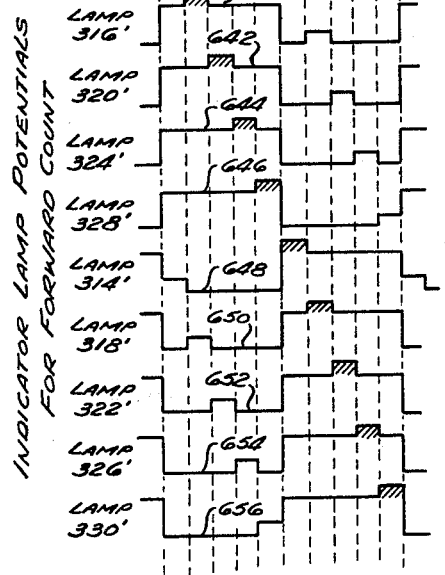
Fig. 9
Fig. 10
Fig. 11
INVENTOR.
ROY A. HEMPEL
BY Karl A. Ohralik
ATTORNEY

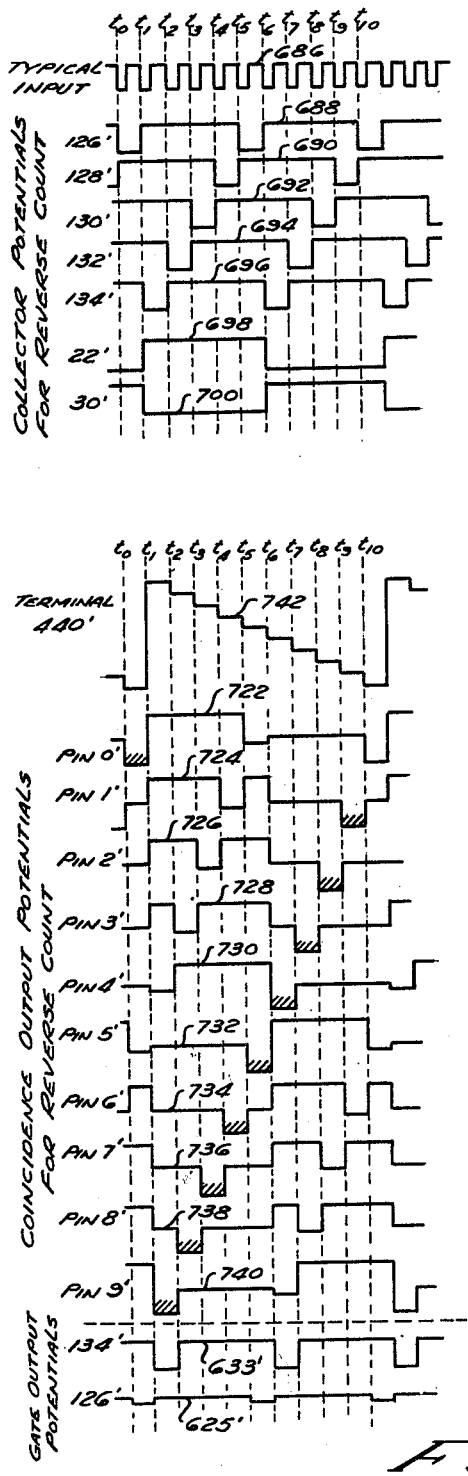
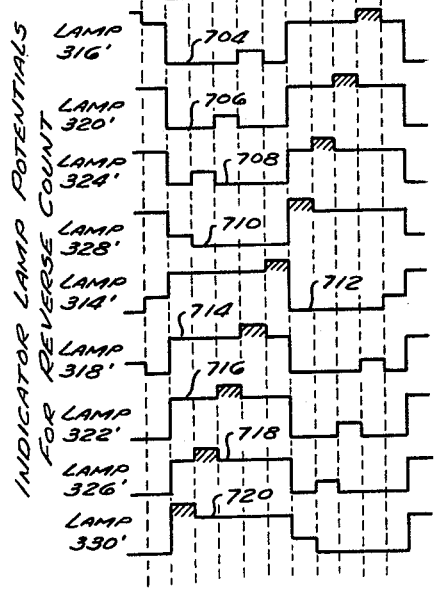
Fig.12
Fig.13
Fig.14

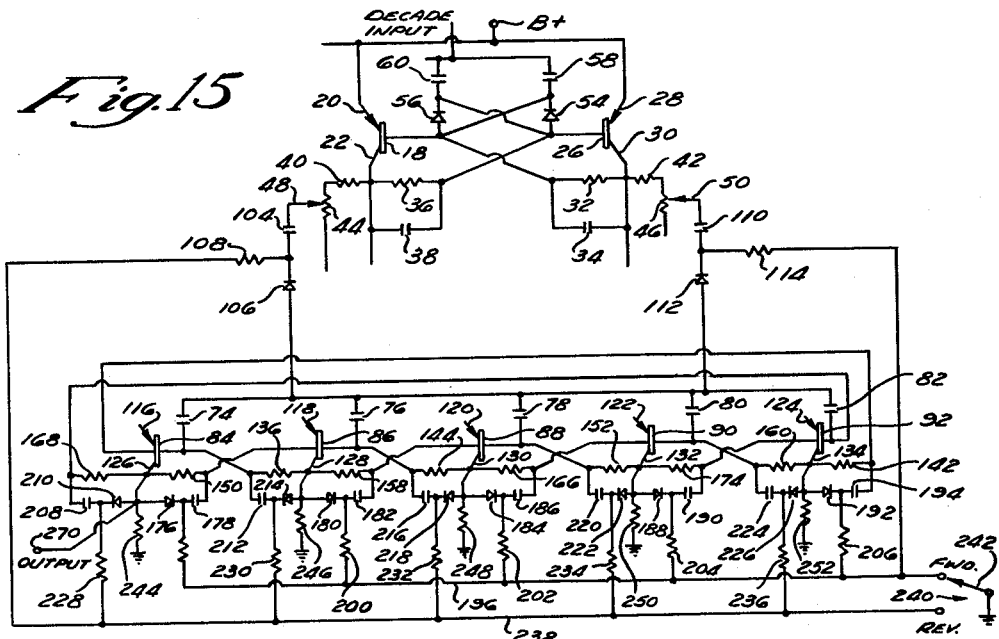
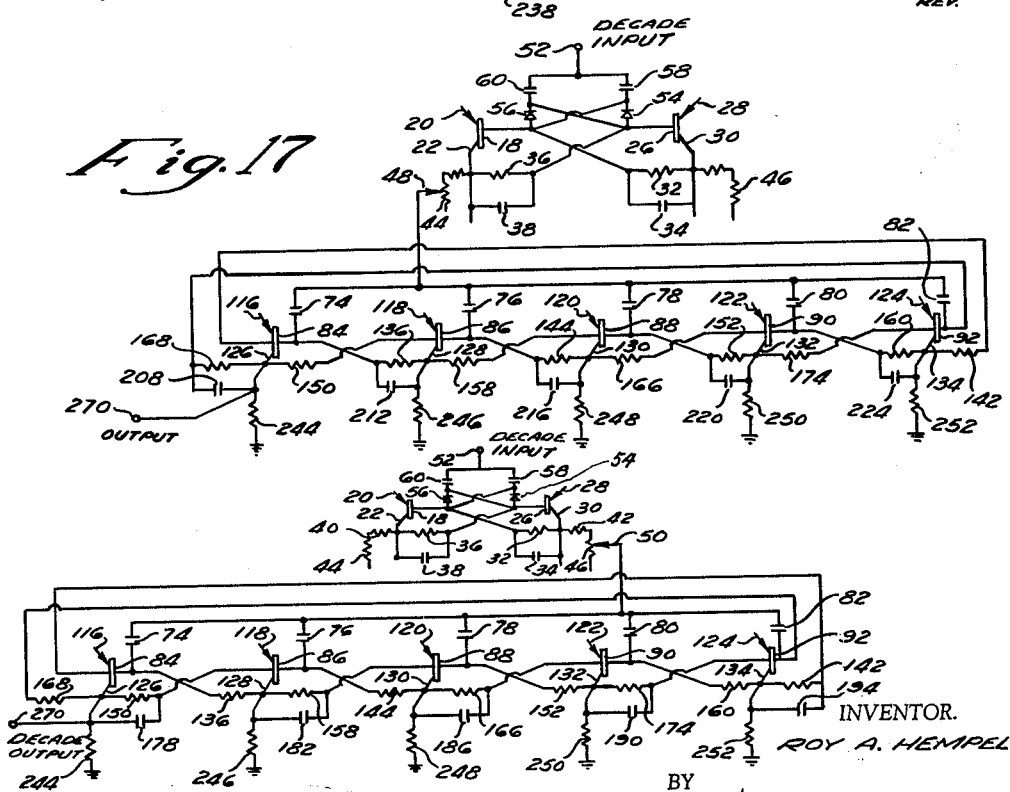
Fig. 15
Fig. 17
Fig. 16

INVENTOR.
ROY A. HEMPEL
BY Karl A. Okralik
ATTORNEY

Nov. 3, 1964     R. A. HEMPEL     3,155,836
ELECTRONIC COUNTER CIRCUIT SELECTIVELY RESPONSIVE TO
INPUT PULSES FOR FORWARD OR REVERSE
Filed July 27, 1959     11 Sheets-Sheet 10

INVENTOR.
ROY A. HEMPEL
BY
Karl A. Ohralik
ATTORNEY

INVENTOR.
ROY A. HEMPEL
BY Karl A. Ohralik
ATTORNEY

United States Patent Office 3,155,836
Patented Nov. 3, 1964

3,155,836
ELECTRONIC COUNTER CIRCUIT SELECTIVELY RESPONSIVE TO INPUT PULSES FOR FORWARD OR REVERSE
Roy A. Hempel, Phoenix, Ariz., assignor, by mesne assignments, to Textron Electronics, Inc., Providence, R.I., a corporation of Delaware
Filed July 27, 1959, Ser. No. 829,870
2 Claims. (Cl. 307—88.5)

This invention relates to an electronic counter circuit of the type having multiple states of stable equilibrium and more particularly relates to features of novelty incorporated in such a circuit facilitating improved and more versatile performance thereof.

In electronic counter circuits of the type forming the subject matter of my application, Serial No. 609,131, filed September 11, 1956, now Patent 3,038,658, active circuit elements such as transistors are intercoupled to have multiple states of stable equilibrium wherein in each state of stable equilibrium, a different combination of conducting and non-conducting active circuit elements is established. The circuit is placed in successive states of equilibrium by the impression of electrical impulses of a predetermined polarity to a particular point in the circuit and in each state, a combination of potentials is produced to activate a visual or other means for indicating the count or number of pulses, less than a predetermined number, so impressed. Such impulses may be produced by any of a large number of types of transducers responsive to a wide variety of events or occurrences of a physical or other nature. Accordingly, in combination with such a transducer, this circuit is responsive to give an indication of the number of events or occurrences less than a predetermined number, taking place. In combination with further identical counters, an indication greater than the predetermined number may be obtained.

It is a primary object of my present invention to further improve the invention disclosed in the aforementioned application by facilitating reverse as well as forward counting of electrical impulses as hereinabove briefly described. In many applications of a counter, it is desirable to obtain a count of the number of events or occurrences of one type; less a number of another type. As an example, it may be desirable to obtain a "net" count of objects passing a particular location, which "net" count is the number passing in one direction less the number passing in the opposite direction. Or as another example, in an electromechanical calculator it may occur that it is necessary to subtract a predetermined number from another number. According to this feature of invention, the circuits may be easily and readily conditioned for count in a forward direction or in a reverse direction in furtherance toward this end.

It is another object of my invention to improve the frequency response of a decade counter circuit in accordance with a novel combination of binary and quinary sections with two and five active circuit elements, respectively, each section having multiple states of stable equilibrium. In accordance with this feature, a single quinary section output pulse is applied to the binary section input in response to every five pulses applied to the quinary section input and the binary section produces a single output pulse for every two received from the quinary section. The repetition cycle of the binary section is therefore reduced over that required in a binary-quinary type of counter wherein pulses are first fed to the binary circuit, the output of which is fed to the quinary circuits, whereby the frequency response of the entire circuit is increased.

It is another object of my invention to further improve the reliability of counter reset in an electronic counter circuit and to accomplish this feature with a lower magnitude and less critical electrical potential.

It is another object of my invention to improve the potential operating range of neon lamp indicators of the counter circuit.

It is still another object of my invention to produce stronger output pulses indicative of the instantaneous circuit count from an electronic counter circuit and to accomplish this advantage with simplified output line circuitry.

It is another object of my invention to provide an electronic counter indicator circuit operable with low, pulsating direct potential supply.

It is another object of my invention to provide an electronic counter circuit adaptable for operation at potentials considerably lower than heretofore possible with prior art counters.

It is still another object of my invention to provide an improved circuit for producing a "staircase" output potential having substantially equal successive increments of direct potential in response to a succession of input pulses.

It is another object of my invention to facilitate appropriate extinction of lamp indicators in a counter circuit.

FIGURES 2, 3 and 4 represent potential wave forms at points in the circuit of FIGURE 1 at different instants of time during forward count;

FIGURES 9, 10 and 11 represent potential wave forms at points in the circuit of FIGURE 8 at different instants of time during forward count;

FIGURES 12, 13 and 14 represent potential wave forms at points in the circuit of FIGURE 8 at different instants of time during reverse count;

FIGURE 15 is a simplified schematic representation of the binary-quinary decade counter circuit shown in FIGURE 1, including the essential features for forward and reverse operation;

FIGURE 16 is a simplified schematic representation of the circuit shown in FIGURE 15 conditioned and effective for achieving forward count;

FIGURE 17 is a simplified schematic representation of the circuit shown in FIGURE 15 conditioned and effective for achieving reverse count;

Figure 1:
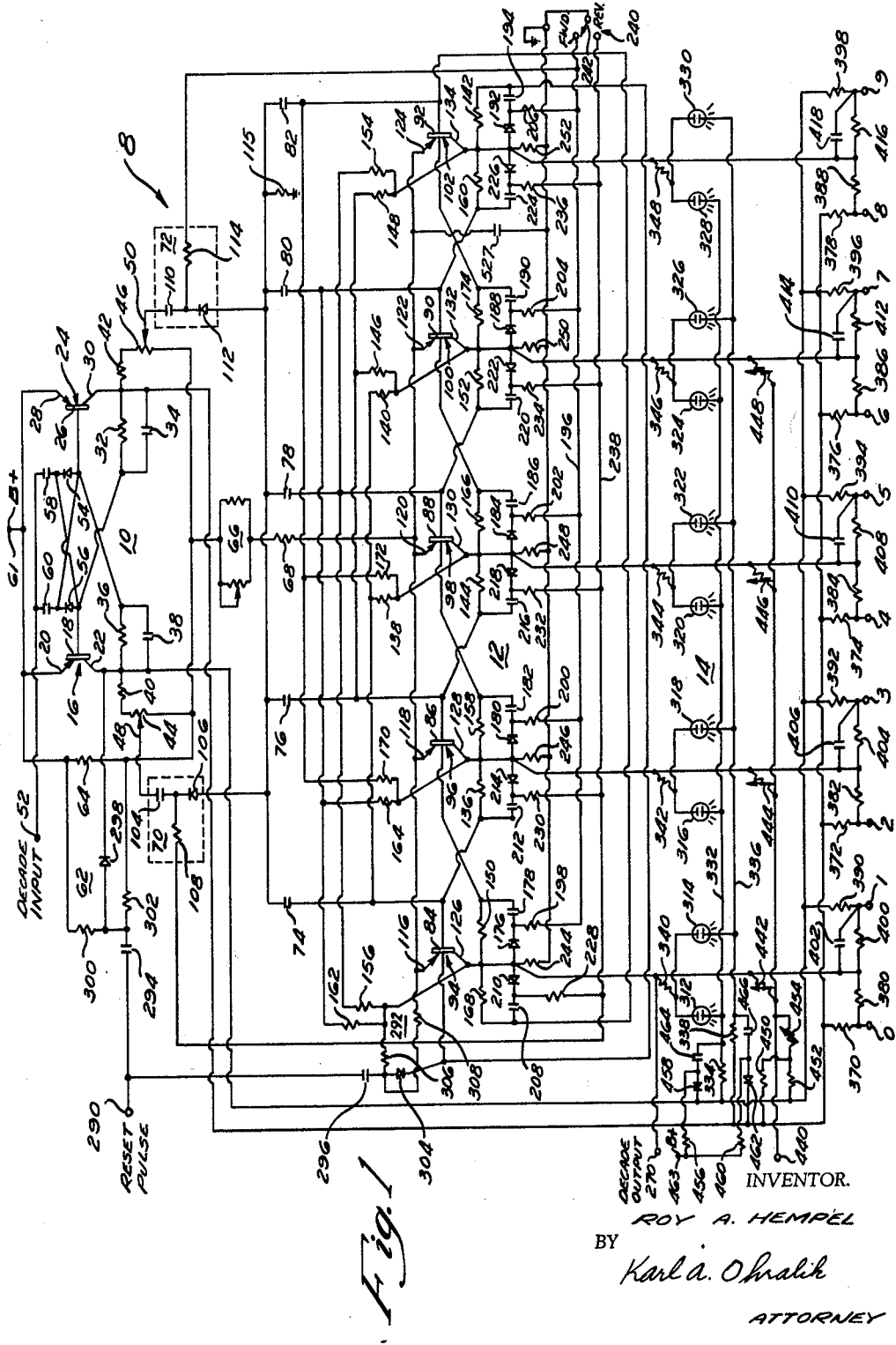
FIGURE 1 shows a binary-quinary reversing decade counter according to the invention.

Referring now to FIGURE 1 of the drawings, 8 represents generally the binary-quinary decade counter circuit of the invention having a binary section 10 which receives incoming pulses and delivers an output pulse to the quinary section 12 of the circuit for every two pulses received in the binary circuit. The quinary section is effective in delivering a single output pulse for every five pulses received from binary section 10 whereby the circuit as a whole delivers an output pulse for every ten pulses received in its input. A visual indicator section 14 is provided for indicating the number of pulses from zero to nine received subsequent to a reset condition of the counter.

Binary section 10 includes a first three element, semiconductor device 16 hereinafter referred to as a transistor comprising a base 18 preferably of N-type semiconducting material as is presently well known, an emitter 20 and a collector 22 both of P-type semi-conducting material and a second, three element transistor 24 having a base 26 preferably of N-type semi-conducting material, an emitter 28 and a collector 30 both also of P-type semi-conducting material. The transistors 16 and 24 are interconnected with passive circuit elements in a manner so as to provide a flip-flop or direct coupled multivibrator circuit wherein base 18 is coupled to collector 30 through a resistor 32 shunted by a capacitor 34 and base 26 is coupled to collector 22 through a resistor 36 shunted by a capacitor 38. A pair of load resistors 40 and 42 and potentiometers 44 and 46 are serially connected between collectors 22 and 30 and arms 48 and 50 of the potentiometers are coupled to quinary circuit 12 for selectively applying pulses to the quinary in accordance with a preselection hereinafter set forth and described in detail.

For receiving incoming pulses to the counter circuit from an input terminal 52, a pair of diodes 54 and 56 are connected in series aiding polarity in a closed loop and the respective junctions between diodes are connected to respective bases 18 and 26 to input terminal 52 through respective capacitors 58 and 60. A source of direct potential as indicated as B+ is supplied to the emitters 20 and 28 through lines connected thereto from a terminal 61. Diodes 54 and 56, which are effective in increasing the frequency reponse of the binary section may be replaced by resistors. However, the unilateral elements are more effective in this function.

A resetting circuit for the binary section is shown generally at 62 in FIGURES 1 and 21 and is set forth and described in detail hereinbelow in conjunction with the resetting feature of the quinary section.

In normal operation, binary section 10 utilizes a certain value of current which by the generally series arrangement of binary and quinary sections is also utilized in the quinary section. The quinary section, however, requires somewhat greater power for its operation and the binary current is supplemented by an alternate path from potential source B+ through resistor 64 connected to this source and to an adjusable potentiometer 66 in series with a resistor 68 for connection to the emitters of the quinary circuit to be described.

The individual elements of binary circuit 10 are so proportioned as to provide a completely balanced circuit. Transistors 16 and 24 are chosen to be of identical type, resistors 32 and 36 are of the same value, and capacitors 34 and 38 of the same value to approach a balanced symmetrical circuit. It is known, however, that it is a physical impossibility to achieve a perfect balance in such a circuit. Accordingly, in the circuit of binary section 10, upon the application of potential to emitters 20 and 28 from source B+, such an imbalance causes a slightly greater current flow in one of the transistor collectors over the other, whereby the potential across the load resistor of the greater conducting transistor is increased and such increment is applied to the base of the lesser conducting transistor in such polarity as to reduce the current flow of the lesser conducting transistor. As a consequence, the potential across the load resistor of the lesser conducting transistor is decreased and such decrement is applied to the base of the greater conducting transistor to even further increase its conduction. In a known manner, this action is cumulative and recurs many times in a short period of time whereby one transistor is finally rendered conducting heavily and the other transistor is conducting so lightly as to be considered "cut off" or not conducting at all, for all practical purposes. In this stable condition, the base of the cut off transistor is receptive to signals of the proper polarity to initiate conduction therein which will produce a signal in its output circuit of such polarity as to lessen conduction in the heavily conducting transistor when the signal is applied to its base, and the potential change in the output circuit of such heavily conducting transistor is of such polarity to increase conduction in the previously cut off transistor when applied to its base. This latter action, once initiated, also recurs many times in rapid succession until the formerly cut off transistor is conducting heavily and the previously heavily conducting transistor is cut off to form another stable state of equilibrium. Accordingly, two stable states of equilibrium exist for the binary circuit. In one state, a first transistor is heavily conducting while the second transistor is cut off and in the other state, the second transistor is heavily conducting while the first transistor is cut off. During heavy conduction, either of the transistors is unresponsive to potentials applied to the base thereof tending to render the same more conductive. Accordingly, during any one state of equilibrium above described, application of the same pulse of proper polarity to initiate conduction in a transistor, to both of the transistor bases simultaneously, is of the same effect as the application of such a pulse to the cut off transistor only. As a consequence, the simultaneous application of an input pulse of the proper polarity at input 52 is effective to shift the state of equilibrium of transistors and subsequent such pulses cause the state of equilibrium to alternate.

As seen in FIGURE 2 of the drawings, a typical input to the counter may be a series of negative rectangular wave pulses as shown at 53 in the first line in this figure. Although the reference line is not shown, it should be understood that all points of this wave are negative. The output potentials appearing at different instants of time at the respective binary transistor collectors are shown at 23 and 31 in the second and third lines of this figure as negative rectangular waves of frequency equal to one-half the input pulse frequency and 180 degrees out of phase with each other. As designated in this figure, $t_0$ represents an initial instant of time at which the binary circuit is reset, with transistor 16 conducting and transistor 24 cut off and the respective collectors at maximum and minimum potentials. At time $t_1$, the leading edge of the first input pulse of wave 53 has passed to initiate the above described sequence of cumulative events in the binary section to render transistor 24 conducting and transistor 16 cut off. Accordingly, the potential of collector 30 of transistor 24 rises from a minimum to a maximum and the potential of collector 22 of transistor 16 drops from a maximum to a minimum value. As the succeeeding incoming pulses are applied, the binary collector potentials reverse at the leading edge of each pulse. It is to be noted, however, the potential at either collector has one-half the number of leading edges as found in the pulses of the incoming signal.

As explained hereinabove, with each change of equilibrium of the transistors, the potential at the collectors thereof changes sharply whereby a pulse is produced at such collector. The negative pulses produced at the collectors 22 and 30 are applied through respective gating circuits 70 and 72, through capacitors 74, 76, 78, 80 and 82 to the bases 84, 86, 88, 90 and 92 of the transistors 94, 96, 98, 100 and 102, of the quinary section. Gating circuit 70 includes a capacitor 104 connected in series with a diode 106 and a resistor 108 connected to the junction therebetween for applying a biasing potential in a manner hereinbelow more fully explained, and gating circuit 72 similarly includes a capacitor 110 connected in series with a diode 112 and a resistor 114 connected to the junction therebetween, also for applying a biasing potential derived in a manner to be explained. Each of the diodes 106 and 112 has its anode connected to ground through the same resistor 115. The anode of the diodes herein are represented by the arrow and the cathode is represented by the straight line. Thus, by the application of a potential across the diode, positive at the anode and negative at the cathode, current readily flows since the diode presents a low resistance to such current but in response to a reverse application of potential, that is, positive at the cathode and negative at the anode of each diode, only negligible current flows through the diode since it presents a high resistance to such current. This latter biasing condition is herein referred to as a "back" bias.

The transistors 94 through 102 of the quinary circuit 12 have bases of N-type semi-conducting material and further include respective emitters 116, 118, 120, 122 and 124 of P-type semi-conducting material and respective collectors 126, 128, 130, 132 and 134 of P-type semi-conducting material. In addition to the transistors, quinary 12 includes passive circuit elements intercoupling the transistors in a closed loop to provide a circuit having five states of stable equilibrium in each of which states, one transistor is cut off and the four others are conducting similar to binary circuit 10. In any such state of equilibrium of the quinary circuit, the cut off transistor is responsive to a pulse of negative polarity of sufficient magnitude applied to its base, to initiate conduction therein with the result that the potential at its collector suddenly rises to apply a positive pulse to components coupled thereto. Similarly, a positive pulse of sufficient magnitude applied to any quinary circuit transistor base is effective to change it from a condition of conduction to one of non-conduction to produce a negative pulse at its collector.

The base of each transistor of the quinary section is coupled to the collector of each other transistor of this section. Base 84 is coupled to collectors 128, 130, 132 and 134 through respective resistors 136, 138, 140 and 142, base 86 is coupled to collectors 130, 132, 134 and 126 through respective resistors 144, 146, 148 and 150, base 88 is coupled to collectors 132, 134, 126 and 128 through respective resistors 152, 154, 156 and 158, base 90 is coupled to collectors 134, 126, 128 and 130 through respective resistors 160, 162, 164 and 166 and base 92 is coupled to collectors 126, 128, 130 and 132 through respective resistors 168, 170, 172 and 174. In accordance with a feature of the invention, resistors 150, 158, 166, 174 and 142 are shunted by respective series connected diode-capacitor combinations 176 and 178, 180 and 182, 184 and 186, 188 and 190, and 192 and 194 with each diode oriented to have its cathode connected to the capacitor of the combination. For convenient reference, these combinations are hereinafter referred to as the forward set in that in a manner hereinbelow explained, they are functional to achieve forward count of the circuit. The junctions of the capacitor and diode of these diode-capacitor combinations are coupled to a "forward" line 196 through respective resistors 198, 200, 202, 204 and 206. Additionally, resistors 168, 136, 144, 152 and 160 are shunted by respective series connected capacitor-diode combinations 208 and 210, 212 and 214, 216 and 218, 220 and 222, and 224 and 226 with the cathode of each diode connected to the capacitor of the combination. For convenient reference, these combinations are hereinafter referred to as the reverse set in that in a manner also explained hereinbelow, they are functional in achieving reverse count of the circuit. The junctions of the capacitor and diode of these capacitor-diode combinations are coupled through respective resistors 228, 230, 232, 234 and 236 to a "reverse" line 238. Lines 196 and 238 are selectively connectable to a ground through a switch 240 having an arm 242 connected to ground and manipulable to engage either of these lines. To assure a circuit return and thus to avoid "floating" of both of the lines 196 and 238 simultaneously, switch arm 242 necessarily contacts either one or the other of these lines and cannot be disengaged from both except for very minute intervals during switching. The collectors 126, 128, 130, 132 and 134 of the quinary circuits are connected to ground through respective resistors 244, 246, 248, 250 and 252. In this arrangement a closed circuit is established wherein each transistor circuit bears the same relationship to, affects and is affected by the transistor circuits adjacent thereto as any other transistor circuit is related to, affects or is affected by adjacent transistor circuits similarly situated. As an example, the circuit of transistor 96 is related to the circuits of transistors 94 and 98 in the same manner as the circuit of transistor 100 is related to the circuits of transistors 98 and 102, respectively, or as the circuit of transistor 102 is related to the circuits of transistors 100 and 94, respectively. It is to be observed that the circuits of transistors 102 and 94 are "adjacent" to each other in that electrically the same are connected as any other adjacent transistor circuits. With this quinary section arrangement, by reason of the diode orientation negative pulses are blocked from passage between a collector to the next adjacent base and provision is made for selectively applying positive pulses to the base of one or the other of the next adjacent transistors, depending upon the direction of count desired. A continuous application of such pulses to the bases of transistors on one side of the triggered transistors produces a count in one direction and application of such pulses to the bases of transistors on the other side of the triggered transistors produces a count in the other direction.

The direction of count is controllable by switch 240 which selectively grounds line 196 or line 238. Grounding one of the lines applies zero bias to the negative terminals of the diodes of the set connected to that line. Grounding line 196 applies zero bias to the cathodes of diodes 176, 180, 184, 188 and 192 through the resistors 198, 200, 202, 204 and 206 and grounding line 238 applies zero bias to the cathodes of diodes 210, 214, 218, 222 and 226 through resistors 228, 230, 232, 234 and 236. In each instance the remaining, ungrounded line "floats" at some positive potential above ground since the anode of the diode of each set is connected to a collector of a transistor in the quinary section and the positive potentials of these collectors are applied to the remaining line through the diode and resistor extending to the line. As an example, when line 196 is grounded, line 238 "floats" by reason of the positive potential applied from the collectors to the line through diodes of the reverse set and resistors 228 to 236. Accordingly, the diode of one set, of the cut off transistor, is biased at zero potential while the diode of the other set thereof is biased at the highest positive potential above ground of any of the collectors of the quinary section. Such positive potential is greater than the magnitude of the positive pulse engendered at the collector of the cut off transistor when it is rendered conducting whereby the diode having a positive potential applied to its cathode is sufficiently back-biased to prevent the passage of positive pulses from the corresponding transistor collector. Purely as an illustration of this feature, it is assumed that switch 240 is connected to line 196 to maintain this line at ground potential and that transistor 96 is cut off while the others, viz., 94, 98, 100 and 102, are conducting. A simplified representation of the circuit in this condition is shown in FIGURE 16 wherein the diode-capacitor combinations of the reverse set are omitted as representing in effect an open circuit under these circumstances and the diodes of the forward sets are also omitted since the same merely represent a short circuit under these circumstances. The junction between diode 180 and capacitor 182 being connected to ground through resistor 200, is at zero bias and therefore, no bias opposition is applied to positive pulses from the collector 128 through diode 180 and a low impedance path between collector 128 and base 88 of transistor 98 is established. Diode 214, on the other hand is connected to line 238 through resistor 230 and the collectors of the other transistors of the quinary section are coupled to line 238 through respective diodes 216, 218, 222, and 226 and resistors 228, 232, 234 and 236 to apply the highest positive potential of these collectors to the cathode of diode 214. Accordingly, diode 214 is back-biased at this potential, or in other words a potential in excess of this back-bias, must be applied to the anode of the diode before current flows therethrough. The elements and potentials of this circuit are selected to apply sufficient potential back-bias to that diode not having its cathode ground in order to prevent passage of the pulse developed at the collector of the triggered transistor through this diode.

It is to be noted that upon the passage of the pulse to the next adjacent transistor, that adjacent transistor is cut off and as explained hereinabove with respect to the circuit of transistor 96, the diodes of the newly cut off transistor are respectively, back biased for pulse blocking and at ground potential, for appropriate conditioning for pulse transfer in the proper direction when that transistor is triggered.

At each alternation in conduction of the transistors of the binary section, a pulse, either positive or negative is produced at the collectors of these transistors, depending on whether the transistor is rendered conducting or is cut off. For proper operation, only negative pulses from the binary section are applied to the bases of the quinary transistors and therefore, positive pulses are excluded. To this end, gates 72 and 70 are utilized selectively for respective forward and reverse operation of the counter. Gate 72 is conditioned to pass only negative pulses, while gate 70 is conditioned to block passage of all pulses for forward count.

It is noted that lines 196 and 238 are, respectively, directly connected to the cathode of diodes 112 and 106 whereby the potential existing on these lines are applied to the respective diodes as a bias. In the forward position of switch 240 wherein arm 242 is connected to line 196, to ground the same, a zero bias is applied to the cathode of diode 112. Therefore, this diode imposes no appreciable opposition to negative pulses applied thereto through capacitor 110 from collector 30. Because of its nature and physical orientation, diode 112 blocks passage of positive pulses from collector 30 irrespective of the bias applied to the diode. Under these circumstances, the cathode of diode 106 is biased positively at substantially the highest potential of the collectors of conducting transistors in the quinary section because line 238 is coupled thereto through diodes in a manner already explained. Consequently, a back bias is applied to the diode 106 imposing opposition to negative pulses applied to the cathode thereof. In accordance with the proportioning of the circuit elements and potentials utilized, such back bias exceeds the magnitude of negative pulses produced at collector 22. By its nature and orientation in the circuit, diode 106 blocks passage of positive pulses from collector 22. Accordingly, neither negative nor positive pulses are passed through diode 106 from collector 22 when switch 240 is positioned for forward count.

The binary section receives input pulses forming a wave as represented at 53 in the first line of FIGURE 2. Each leading edge of each pulse of wave 53 is effective to alter the condition of equilibrium in the binary section whereby the potentials at collectors 22 and 30 are as represented by the waves 23 and 31. At time $t_1$, the leading edge of the input pulse causes transistor 16 to be cut off and transistor 24 to be triggered, at time $t_2$, transistor 16 is triggered and transistor 24 is cut off. The potentials existing at collectors of respective transistors 94, 96, 98, 100 and 102 at different instants of time, are shown by waves 260, 262, 264, 266 and 268 in the fourth, fifth, sixth, seventh and eighth lines of FIGURE 2 wherein it is observed that from time $t_0$ to $t_2$, transistor 94 is cut off and rendered conducting at $t_2$ in response to the leading edge of the negative going potential wave of transistor 24. As transistor 94 is rendered conducting at time $t_2$, transistor 96 is cut off until time $t_4$ when it becomes conducting and transistor 98 is cut off. At time $t_6$, transistor 98 is rendered conducting and transistor 100 is cut off, at time $t_8$ transistor 100 is rendered conducting and transistor 102 is cut off and finally at time $t_{10}$, a cycle is completed wherein transistor 102 is rendered conducting, transistor 94 is cut off and an output pulse is produced at terminal 270 coupled to collector 126 of transistor 94. At any instant of time, four of the transistors of the quinary section are conducting while only one is cut off.

Figure 5:
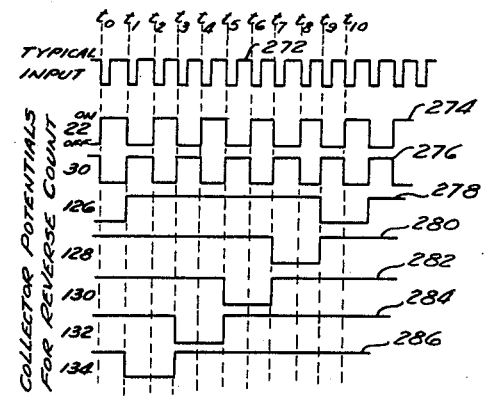
FIGURES 5, 6 and 7 represent potential wave forms at points in the circuit of FIGURE 1 at different instants of time during reverse count.

Upon positioning switch 240 to connect line 238 to ground, the quinary section is conditioned for reverse counting. A simplified representation of the circuit in this condition is shown in FIGURE 17 wherein the forward diode-capacitor combinations are omitted as being in effect an open circuit and diode of the reverse sets are omitted as being in effect short circuits under the circumstances. Assuming for purposes of illustration, that transistor 96 is cut off, ground potential is applied to the junction between capacitor and resistor of capacitor-resistor combination 212–214 as well as others similarly situated and back bias is applied from now "floating" line 196 to the junction between diode 180 and capacitor 182 to block the passage of pulses through diode 180. Diode 214 having zero bias, readily passes pulses therethrough to base 84 to cut off transistor 94. Accordingly, the direction of count is reversed from that previously described. When switch 240 is positioned for reverse count, a back bias is applied to diode 112 and back bias is applied to diode 106 from respective lines 196 and 238 whereby diode 112 passes no pulses at all and diode 106 passes only negative pulses at every second input pulse. A reverse count is achieved wherein the transistors conduct as indicated in FIGURE 5 of the drawings, in response to the succession of incoming pulses shown. Input pulse wave 272 as in the case of forward count, produces potential waves 274 and 276 at collectors 22 and 30 of the binary section which are observed to be of the same form as waves 256 and 258 engendered at these collectors during forward count. The potentials at collectors 126, 128, 130, 132 and 134 as represented by waves 278, 280, 282, 284 and 286 are observed to be in reverse from waves 260 through 268 in that the cut-off period proceeds from transistor 102 to transistor 94 in a reverse manner during the reverse count while the cut-off period progresses from transistor 94 to transistor 102 during forward count.

Figure 21:
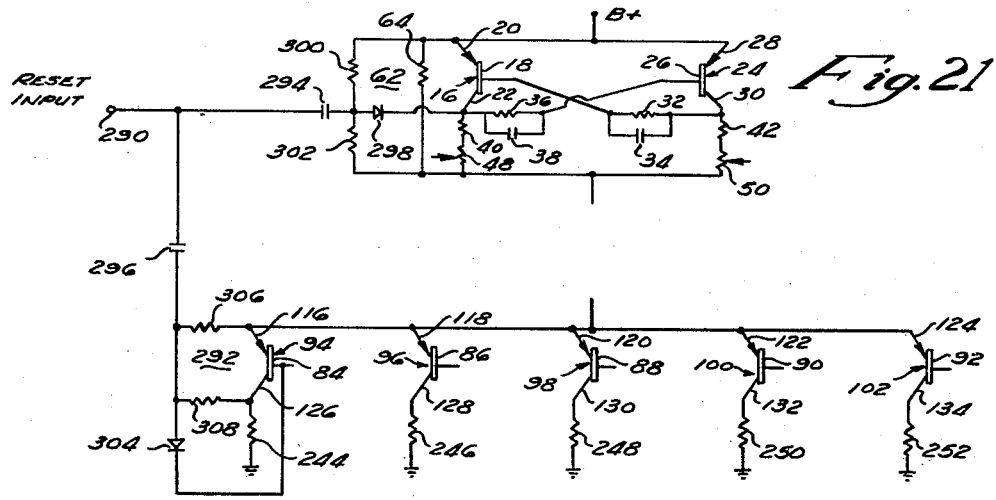
FIGURE 21 is a simplified schematic representation of the binary-quinary decade counter circuit shown in FIGURE 1 and including the essential circuit elements for resetting the counter to initial condition or zero count.

Referring now to FIGURE 21 as well as to FIGURE 1 for an understanding of the resetting feature of the invention, it is observed that reset input terminal 290 is coupled to binary reset circuit 62 and to quinary reset circuit 292 through respective capacitors 294 and 296. Circuit 62 includes a diode 298 having its anode connected to an intermediate point of a potential divider including resistors 300 and 302 serially connected between B+ and a point of lower potential, and its cathode connected to collector 22. Circuit 292, on the other hand, includes a diode 304 having its positive terminal connected to an intermediate point of a voltage divider including resistors 306 and 308 connected between potentiometer 66 and a point of lower potential and its cathode connected to base 84. The resistor elements of the respective potential dividers are so sized and proportioned as to impress on the anode of each diode 298 and 304, a positive, or in other words a forward potential bias, sufficiently large in magnitude to equal or slightly exceed the potential appearing at the respective collector 22 and base 84 when these transistors are cut off and conducting, respectively. Accordingly, positive reset pulses of small magnitude, only slightly larger than pulse required to cause a shift in equilibrium of the binary and quinary circuits are required. It is further to be noted that the orientation of diodes 298 and 304 mutually excludes pulses of any polarity engendered in either section from being transmitted to the other section. Diode 298 is oriented to block positive pulses from collector 22 and diode 304 blocks negative pulses from collector 22. Diode 304 blocks positive pulses from base 84 and diode 298 blocks negative pulses from base 84. Thus, only positive reset pulses applied at terminal 290 reach the respective sections. Such a pulse applied to collector 22 and base 26 is effective to render transistor 16 conducting and transistor 24 cut off if not already in this state, or if already in this state it fails to affect the conduction therein. Such a pulse is applicable to the base 84 of transistor 94 to cut off conduction therein if conducting or to fail to affect the same if not conducting. Such a condition of transistor 94 leaves transistor 94 cut off and transistors 96, 98, 100 and 102 conducting. This is the initial or reset condition of the transistors of the counter circuit.

For providing a visual indication of the number of incoming pulses from 1 to 9 received by the counter circuit, ten neon lamps 312, 314, 316, 318, 320, 322, 324, 326, 328, and 330 are provided and have potentials derived from collectors of the binary and quinary transistors applied thereacross to selectively fire or light the same or to allow the lamps to extinguish. One terminal of each of lamps 312, 316, 320, 324 and 328 is connected to a line 332 extending to collector 22 of transistor 16 through a current limiting resistor 334 and one terminal of each of lamps 314, 318, 322, 326 and 330 is connected to a line 336 extending to collector 30 of transistor 24 through current limiting resistor 338. The other terminals of lamps 312 and 314 are joined together and connected to output terminal 270 and collector 126 through resistor 340, the other terminals of lamps 316 and 318 are joined and connected to collector 128 through resistor 342, the other terminals of lamps 320 and 322 are joined and connected to collector 130 through resistor 344, the other terminals of lamps 324 and 326 are joined and connected to collector 132 through resistor 346 and the other terminals of lamps 328 and 330 are joined and connected to collector 134 through resistor 348.

It is noted that resistors 334 and 338 are each in five series circuits including a different neon lamp and a different resistor and that each of these circuits is connected across a different combination of collectors, one of which is in the binary section and the other of which is in the quinary section. Lamp 312 and resistors 334 and 340 are across collectors 22 and 126, lamp 314 and resistors 338 and 340 are across collectors 30 and 126, lamp 316 and resistors 334 and 342 are across collectors 22 and 128, lamp 318 and resistors 338 and 342 are across collectors 30 and 128, lamp 320 and resistors 334 and 344 are across collectors 22 and 130, lamp 322 and resistors 338 and 344 are across collectors 30 and 130, lamp 324 and resistors 334 and 346 are across collectors 22 and 132, lamp 326 and resistors 338 and 346 are across collectors 30 and 132, lamp 328 and resistors 334 and 348 are cross collectors 22 and 134 and lamp 330 and resistors 338 and 348 are across collectors 30 and 134. Resistors 340, 342, 344, 346 and 348 aid the firing and extinction of the ten neon lamps. The potentials appearing across the lamp circuits above described are graphically shown in FIGURE 4 of the drawings wherein waves 350, 352, 354, 356, 358, 360, 362, 364, 366 and 368 represent potentials at any instant of time across respective circuits of lamps 312, 314, 318, 320, 322, 324, 326, 328 and 330. The circuit elements and potentials of the circuit are so sized and proportioned as to provide sufficient potential between the collector of a conducting binary section transistor and collector of a non-conducting quinary section transistor to fire or light a lamp while any other combination of potentials at the collectors such as potentials between a conducting binary collector and conducting quinary collector, fails to fire the same.

As observed in FIGURE 4, the potential across each lamp circuit varies in a generally square wave manner in response to the input pulses applied to the counter. The potential difference between the collector of the conducting transistor of the binary circuit and the collector of the non-conducting transistor of the quinary circuit is greater in each instance, than the potential differences across any other pairs of collectors above described. This is indicated by a uniquely enlarged portion on each wave and the potential represented by this portion is equal to or greater than that required to fire the neon lamp of the corresponding circuit. The potentials represented by other portions of the wave are insufficient to fire the lamps. As a specific example, at reset or zero count, at time $t_0$, wherein transistor 16 of the binary is conducting and transistor 94 of the quinary is non-conducting, the potential difference between the collectors of these transistors is a maximum whereby lamp 312 is fired to indicate zero count. As seen in FIGURE 4, the potentials at all other lamps at time $t_0$, are below the maximum and therefore the lamps remain extinguished. After the first pulse at time $t_1$, transistor 16 is rendered non-conducting and transistor 24 is rendered conducting. Accordingly, the potential difference between collectors 30 and 126 is greatest as indicated on wave 352 at this time, to light lamp 314, indicating count one (1). Lamp 312 extinguishes because the potential thereacross is decreased to a value below its extinguishing potential. With each succeeding input pulse, the lamps are fired by the maximum potential difference across collectors at that instant of time to indicate the number of the count up to 9 after which the next input pulse causes the circuit to reset. Thus, the lamps 312 through 330 uniquely fire in the sequence 312, 314, 316, 318, 320, 322, 324, 326, 328 and 330 in response to a succession of ten input pulses and in response to further input pulses, the lamp firing is repeated. Reset prior to the tenth pulse may be obtained by applying a reset pulse at terminal 290 in a manner explained hereinbelow.

According to another feature of my invention, the resistors 340, 342, 344, 346 and 348 and resistors 334 and 338 improve the performance of the circuit by facilitating the unique firing of only that neon lamp corresponding to the count numbers of the circuit. That is, without the provision of these resistors, the lamp indicator circuit is subject to irregular performance such as simultaneous firing of more than one of the neon lamps. By the provision of these resistors, however, the current flow of the fired lamps is effective to produce a potential drop across appropriate ones of these resistors to reduce to potential applied to others of the lamps to avoid the possibility of firing. Thus, purely as an example, in response to an input pulse rendering transistor 16 conducting and transistor 96 non-conducting, appropriately, neon lamp 316 has a firing potential applied across it and it fires since under these circumstances collector 22 is at a maximum positive potential and collector 128 is at a minimum positive potential thereby producing a maximum potential difference across lamp 316. The current passing from collector 22 of transistor 16 to collector 128 of transistor 96 passes through resistor 334 interposed in line 332 leading to lamp 316 and through resistor 342 leading from the common junction of lamps 316 and 318 to collector 128. Initially, the firing of lamp 316 is favored over other lamps since it is the lamp of the indicator circuit having maximum potential applied across it and in accordance with a characteristic of neon lamps, greater potentials are required to initiate firing than to maintain the lamp fired or lit. Thus, the potential drop across resistors 334 and 342 lessens the potential applied across other lamps susceptible to firing. In particular, the drop across resistor 342 lessens the potential applied to lamp 318 which has a terminal connected to a terminal of lamp 316 and the drop across resistor 334 lessens the potential applied to line 332 and lamps connected thereto, viz., 312, 320, 324 and 328. The decrease in potentials so applied are less than the firing potentials of the neon lamps but greater than the extinguishing potential thereof whereby lamp 316 remains uniquely fired. In accordance with this feature of my invention wider variation in B+ supply potential or wider variation of setting of potentiometer 66 is permitted since higher potentials increase the susceptibility of firing of more than one of the neon lamps through the use of resistors 340 through 348.

An electrical indication of the count received in the counter input may be obtained at ten output pins 0, 1, 2, 3, 4, 5, 6, 7, 8 and 9. Pins 0, 2, 4, 6 and 8 are connected to collector 30 of transistor 24 through respective resistors 370, 372, 374, 376 and 378 and to collectors 126, 128, 130, 132 and 134 through respective resistors 380, 382, 384, 386 and 388 and pins 1, 3, 5, 7 and 9 are connected to collector 22 of transistor 18 through resistors 390, 392, 394, 396 and 398 and to collectors 126, 128, 130, 132 and 134 through parallel connected resistor-capacitor combinations 400 and 412, 404 and 406, 408 and 410, 412 and 414 and 416 and 148. Referring to FIGURE 3 of the drawings, for forward count the potential appearing at the pins 0 through 9 at different instants of time are represented by waves 420, 422, 424, 426, 428, 430, 432, 434, 436 and 438 wherein for the count of the circuit, the potential at the corresponding pin is a minimum and less than the potential appearing at this pin for any other count. The resistor values of the output line circuitry have been minimized in accordance with good circuit design, to effect a stronger output pulse at the respective output pins. Circuit means responsive to such a minimum potential may be appropriately actuated for further external count indication.

For obtaining a staircase potential as shown at 439 at the top of FIGURE 3 of the drawing in which the potential increases in substantially equal step increments in response to successive input pulses applied to the counter, a staircase output line terminal 440 is connected to collectors 126, 128, 130, and 132 through respective variable resistors 442, 444, 446 and 448 adjusted at progressively greater values of resistance in the order named. Resistors 450 and 452 are serially connected across collectors 22 and 30 and the variable resistor 454 is connected between the junction thereof and line 440. Resistor 452 is of considerably greater resistance than resistors 450 and 454 and is provided for limiting the potential range of collector 30. As hereinabove explained, the collectors of the binary and quinary circuit transistors are at relatively high potentials during conduction of the transistor and at relatively low potentials during non-conduction thereof. Thus, since the resistors 442, 444, 446, 448, 450, 452 and 454 interconnect these collectors through staircase line 440, currents flow from collectors of quinary and binary circuits of relatively high potential to the collector of the quinary circuit of relatively low potential. In so doing, in the different states of equilibrium of the circuit, different potentials are developed at line 440 since the resistors 442, 444, 446 and 448 are of progressively higher value of resistance.

For a further understanding of the operation of the staircase potential producing components, it is noted that at zero count, transistors 24 and 94 are non-conducting with low collector potentials and that all other transistors 16, 96, 98, 100 and 102 are conducting with high collector potentials. Accordingly, currents flow from collectors of quinary transistor collectors 128, 130 and 132 through respective resistors 444, 446, and 448 to line 440 and from line 440 collectively through resistor 442 to collector 126. Thus, at the terminal of resistor 442 connected to line 440, a first staircase potential is produced.

The contribution from collector 22 is negligible because of the high resistance of resistor 452. In response to the next incoming pulse, transistor 24 is rendered conducting and transistor 16 non-conducting. Under these conditions, the increased potential of collector 30 is greater than the potential of collector 126 of transistor 94 whereby this potential difference produces a current flow between these collectors through resistors 450 and 454 contributing to that current from other quinary transistor collectors to collector 126. Accordingly, this increased current flow through resistor 442 increases somewhat the potential drop thereacross and therefore, the potential on line 440. Thus, the second step of the staircase is produced. In response to the third incoming pulse, transistors 24 and 96 are non-conducting and the other transistors are conducting. By reason of potential difference at collectors, current flows from collectors 126, 130 and 132 through respective resistors 442, 446 and 448 to line 440 and from this line to collector 128 through resistor 444. By the proportioning of resistance values of resistors a potential is produced at line 440 greater than at step two, to produce the third step of the staircase. For the fourth step, the contribution of collector 30 is added to further increase the staircase potential. In similar manner counts to eight produce eight steps of the wave. In response to the ninth count, the potential of the quinary transistor collectors 126, 128, 130 and 132 is applied through resistors 442, 444, 446 and 448 directly to line 440 and in response to the tenth pulse an increment from collector 30 of transistor 24 is added through resistors 450 and 454.

For improving the extinguishing action of the neon lamps, diode 458 and capacitor 464 are serially connected between collector 22 and line 332 and diode 462 and capacitor 466 are serially connected between collector 30 and line 336. Resistors 456 and 460 interconect respective the junctions between these serial diode and capacitor combinations and a terminal 463 to which the B+ potential of terminal 61 is applied. The diodes 458 and 462 are thus biased slightly in the forward direction by this B+ potential and capacitors 464 and 466 are prevented from building up a large charge. Accordingly, negative pulses from collectors 22 and 30 pass through respective diodes 458 and 462 and respective capacitors 464 and 466 to be applied to terminals of selected neon lamps to appropriately aid their extinction.

Figure 6:
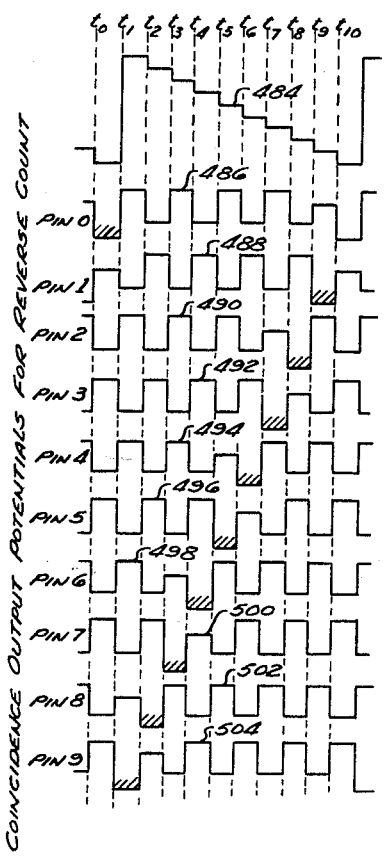
Figure 7:
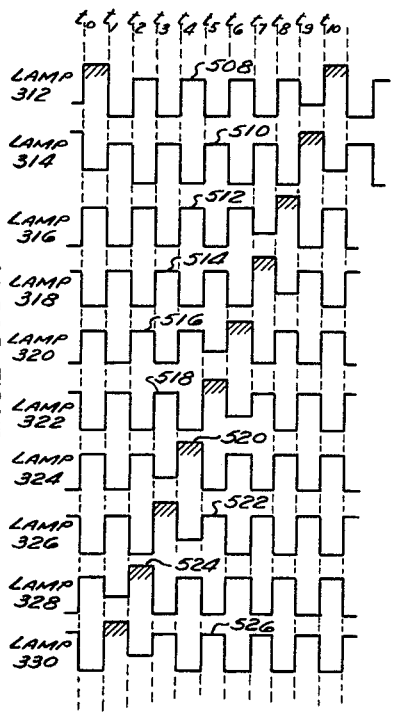

The potential values of various parts of the counter circuit shown in FIGURE 1 are shown for reverse count in FIGURES 5, 6 and 7 wherein FIGURE 5 shows respective waves representing the input pulses and potentials at collectors 22 and 30 and the potentials at collectors 126, 128, 130, 132 and 134 as described hereinabove. In FIGURE 6, the waves 484, 486, 488, 490, 492, 494, 496, 498, 500, 502 and 504 represent, respectively, the potential values at the staircase output terminal 440 and the potentials at pins 0 through 9 wherein the minimum potential of each latter group of waves represents the combination of conducting binary and non-conducting quinary transistors. It should be observed that the staircase, in this event, is reverse to that in FIGURE 3. In FIGURE 7, the waves 508, 510, 512, 514, 516, 518, 520, 522, 524 and 526 represent potentials at different times, across the neon lamp circuits described with respect to FIGURE 1. It is observed that each wave has a unique maximum value for a certain number of input pulse. A capacitor 527 may be provided to produce a better output waveshape at the quinary section collectors and to improve the frequency response of the counter.

By way of example only, specifications and values of circuit components which have been used with admirable success in the embodiment of my invention shown in FIGURE 1 are as follows:

| | |
|---|---|
| All diodes | 1N295. |
| All transistors | 2N136 or 2N113. |
| Resistors: | |
| 68 | 680 ohms. |
| 64 | 1.2K. |
| 40 and 42 | 1.8K. |
| 244, 246, 248, 250 and 252 | 4.7K. |
| 44 and 46 | 5.0K. |
| 115, 136, 138, 140, 142, 144, 146, 148, 150, 152, 154, 156, 158, 160, 162, 164, 166, 168, 170, 172, and 174 | 22K. |
| 32, 36, 108, 114 and 450 | 33K. |
| 198, 200, 202, 204, 206, 228, 230, 232, 234, 236, 370, 372, 374, 376, 378, 380, 382, 384, 386, 388, 390, 392, 394, 396, 398, 400, 404, 408, 412, and 416 | 68K. |
| 442 | 25K potentiometer set on approximately 12K. |
| 444 | 25K potentiometer set on aproximately 15K. |
| 446 | 50K potentiometer set on approximately 27K. |
| 448 | 100K potentiometer set on approximately 56K. |
| 454 | 100K potentiometer set for proper staircase waveform. |
| 300, 302, 306, 308, 450, and 460 | 100K. |
| 334 and 338 | 180K. |
| 66 | 5K potentiometer and 1.5 resistor. |
| 452 | 470K. |
| 340, 342, 344, 346, and 348 | 15K. |
| Capacitors: | |
| 74, 76, 78, 80, 82, 178, 182, 186, 190, 194, 208, 212, 216, 220, and 224 | 220 mmf. |
| 34 and 38 | 330 mmf. |
| 58 and 60 | 68 mmf. |
| 104 and 110 | .001 mmf. |
| 294, 296, 464, 466, and 527 | .01 mf. |
| 402, 406, 410, 414, and 418 | 180 mmf. |
| B+ | 95 volts. |
| All neon lamps: 312, 314, 318, 320, 322, 324, 326, 328, 330 | General Electric Type Ne-2 neon lamp aged and selected to fire at same voltage. |

In accordance with the specifications as set forth hereinabove, the potentials of collectors 22 and 30 may vary from substantially 95 volts during conduction to 75 volts during cut off, the potentials of collectors 126, 128, 130, 132 and 134 may vary from substantially 24.5 volts during conduction to 17.5 volts during cut off and reset pulses are positive at substantially 15 volts. The ten steps of the staircase output voltage are of the order of seven volts total and the individual steps are equal proportions of the total. In a circuit according to the specifications as set forth hereinabove, the described binary-quinary decade counter is capable of effective, accurate operation within an input frequency of 75 kilocycles per second and without the reversing feature is operable accurately and effectively to a frequency of 350 kilocycles per second. The term frequency as used herein is intended to indicate counts per second.

In accordance with a modification of the invention as set forth and described in FIGURES 8, 9, 10, 11, 12, 13, 14, 18, 19, 20, 23, and 24, the frequency response of a reversing decade counter may be greatly improved by the novel cooperation between binary and quinary circuits wherein a quinary-binary circuit arrangement is established. In this embodiment of the invention, many elements are disposed and function similarly to the corresponding elements in FIGURE 1 and a similar 95 volt supply potential is applied at pin 61. Accordingly, these elements are not described with the detail and particularity used in describing similar elements in FIGURE 1. Also, for simplicity and clarity, elements having similar structure and functions are designated by the same numbers primed.

Incoming pulses are first received in the quaniary section 12' to trigger the transistors thereof and output pulses produced in the quinary section in response to every five input pulses are applied to the binary section 10' wherein a single output pulse is produced from the binary section in response to every two pulses received from the quinary section. Thus, a single output pulse is delivered from the counter as a whole in response to every ten input pulses applied thereto and the count of the number of pulses received is indicated by a visual indicator shown generally at 14'.

The quinary section 12' is similar to quinary section 12 in FIGURE 1 and includes five transistors 94', 96', 98', 100', and 102', each having a base, emitter and collector intercoupled with passive circuit elements and a potential source applied to the emitters from the binary section 12' to provide a circuit having five states of stable equilibrium in each of which states, one of the transistors is cut off and the others are conducting. As described with respect to quinary section 12, the quinary section 12' of FIGURE 8 includes appropriately biased diodes controlled by a grounding switch 240' for directing the sequence of cut off and conduction of the quinary section transistors for forward or reverse count.

Input signal pulses to the counter are applied directly to bases of the quinary section transistors at input terminal 680 rather than to the binary section, and each pulse so applied is effective to shift the position of the nonconducting transistor in the quinary in the direction determined by switch 240'.

For cooperation with binary section 10' of the counter, the output of quinary circuit 12' is selectively applied from either collector 126' or 134' of transistors 94' and 102', to the bases 18' and 26' in the binary section through output gate 602 on the one hand or output gate 604 on the other hand. Gates 602 and 604 are controllable by proper potential bias to pass pulses or to exclude the same from the binary section. Gate 602 includes a diode 606 having its cathode connected to collector 126' and its anode coupled to bases 18' and 26' of the binary section transistors through a pair of capacitors 608 and 610 connected to anodes of diodes 54' and 56'. During normal operation the collector 126' varies between different values of positive potential and the positive potential of collector 126' is applied to the cathode of diode 606 tending to apply a back bias thereto. Such a bias would prevent the passage of negative pulses and the orientation of the diode prevents passage of positive pulses engendered at the collector 126′. For facilitating the passage of negative pulses through the diode from collector 126′, a potential bias is applicable to the anode of diode 606 through a resistor 612 leading to the reverse terminal of switch 240′. When switch 240′ is in forward position, line 238′ is "floating" at a potential above ground since it is coupled to the collectors in the quinary section through diodes and resistors extending between this line and the collectors. Such a "floating" bias is of a polarity to be a forward bias for diode 606 neutralizing or overcoming the bias applied to the diode from collector 126′ and therefore the diode readily passes negative pulses from collector 126′ to the binary section bases. In the reverse position of switch 240′, line 238′ is grounded to apply a zero bias to the anode of diode 606. The potential existing at collector 126′ therefore imposes a back bias on the diode whereby all negative pulses of a magnitude less than the back bias are blocked. Accordingly, under this bias, negative pulses at collector 126′ are unaided and are of insufficient magnitude to affect the binary section.

Figure 8:
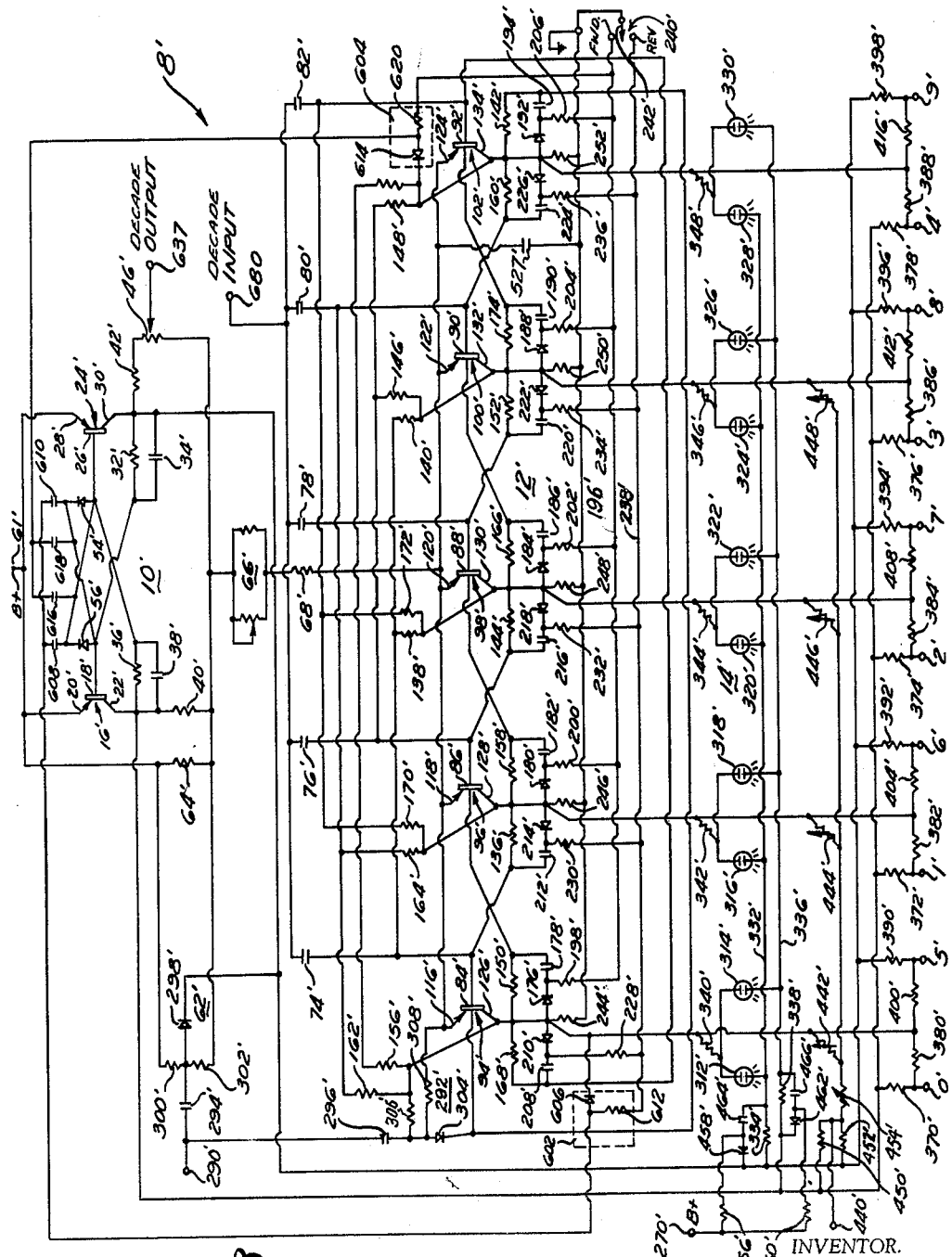
FIGURE 8 shows a quinary-binary reversing decade counter according to a modified form of the invention.
Figure 18:
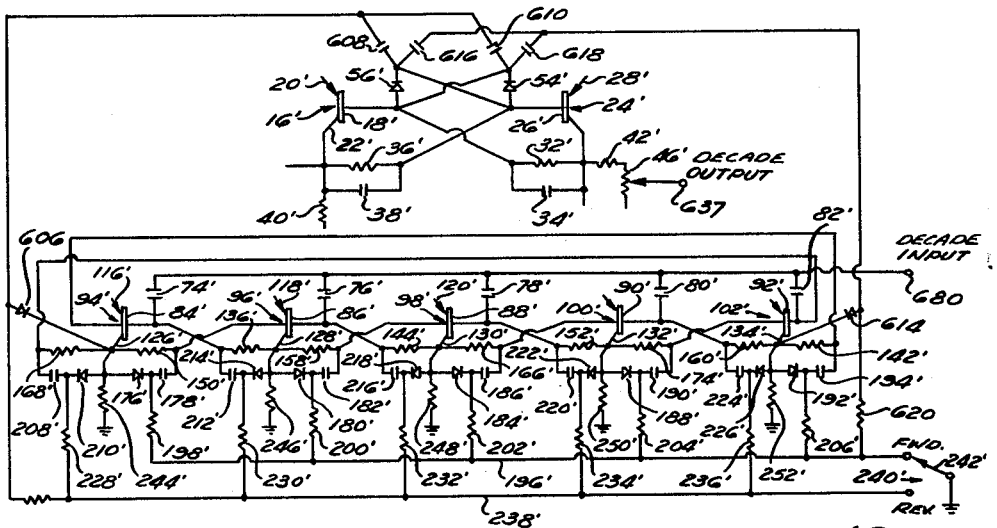
FIGURE 18 is a simplified schematic representation of the quinary-binary decade counter circuit shown in FIGURE 8 and including the essential features for forward and reverse operation.
Figure 19:
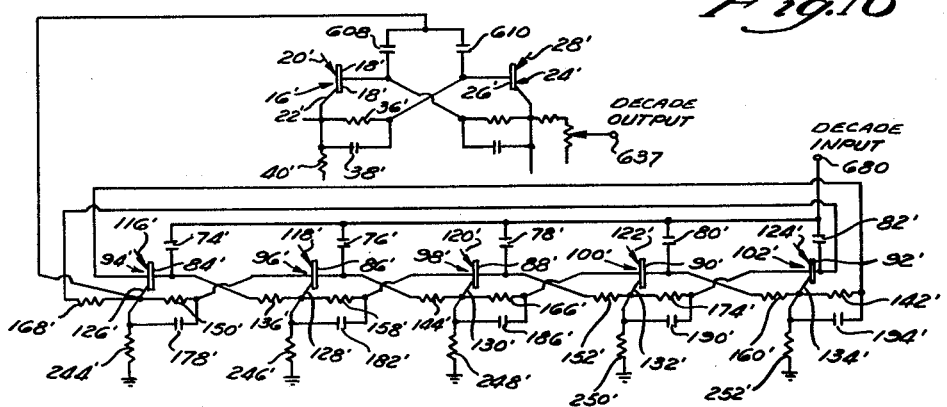
FIGURE 19 is a simplified schematic representation of the circuit shown in FIGURE 18 and conditioned for achieving forward count.
Figure 20:
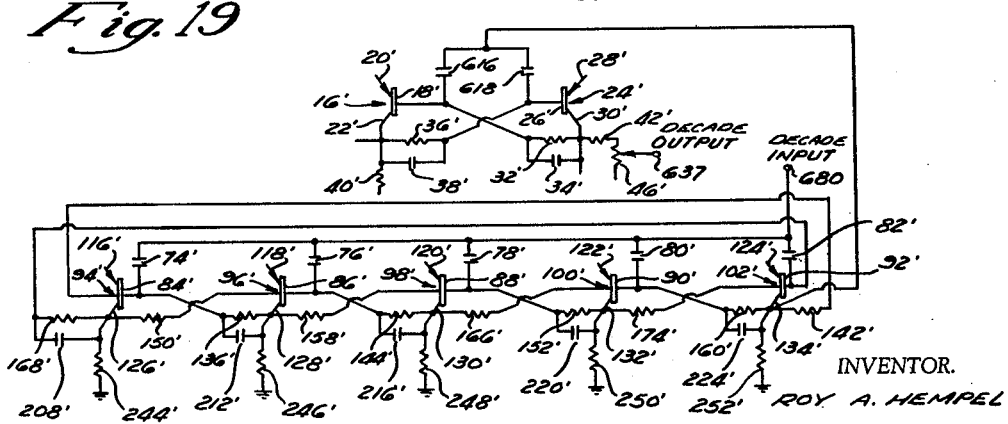
FIGURE 20 is a simplified schematic representation of the circuit shown in FIGURE 18 conditioned for achieving reverse count.

Gate 604 includes a diode 614 having its cathode connected to collector 134′ and its anode coupled to bases 26′ and 18′ through capacitors 616 and 618 and a resistor 620 connected between the anode of diode 614 and forward line 196′. In the reverse position of switch 240′, line 196′ shown in FIGURE 8 is at a positive "floating" potential received from conducting transistor collectors and such potential bias is applied to the anode of diode 614 to permit passage of negative pulses from collector 134′ to the binary section transistor bases. In the forward position of switch 240′, diode 614 is back biased by the potential of collector 134′ to prevent passages of negative pulses.

Typical input pulses are represented at 622 in FIGURE 9 and the potentials at collectors 126′, 128′, 130′, 132′ and 134′ of the quinary section are represented at 624, 626, 628, 630 and 632 in this figure. At time $t_0$, transistor 94′ is cut off and the potential at collector 126′ drops abruptly to a minimum value and at time $t_1$, transistor 94′ is triggered, raising its collector potential to a maximum and transistor 96′ is cut off dropping its collector potential to a minimum. Accordingly, for each ten input pulses, each transistor is cut off twice and in the succession shown in the waves 624 to 632, in FIGURE 9. Either transistor 94′ or 104′ applied two output pulses to the binary for each ten incoming pulses. The transistors of the binary section are shifted in condition of equilibrium in response to each quinary section output pulse occurring at each five pulses received in the quinary section. The output wave from collector 126′ passing through gate 602 is as shown at 625 in FIGURE 10. At time $t_0$, the pulse delivered from the collector 126′ of transistor 94′ in the forward direction through gate 602 to the binary section bases, is of sufficient magnitude to cut off transistor 16′ which triggers transistor 24′ whereby the collector potentials of these transistors fall and rise, respectively, to minimum and maximum values. The potentials remain at such values until another negative pulse is applied to the binary bases from collector 126′ to shift the position of equilibrium in the binary section and shift the collector potentials to respective maximum and minimum values. The cycle of events is completed when a third negative pulse is produced at collector 126′. The binary collector potentials are shown in FIGURE 9 wherein waves 634 and 636 represent, respectively, the potentials at collectors 22′ and 30′. Wave 636, consequently represents also the decade output wave appearing at decade output terminal 637. It is to be observed that wave 633 of FIGURE 10 representing the potential applied to the binary section through gate 604 under these circumstances indicates a small pulse ineffective to trigger the binary section.

For a visual indication of the count from 0 to 9 received by the counter, ten neon lamps 312′ to 330′ are connected together with series resistors in circuit across different combinations of quinary and binary transistor collectors. In a manner similar to the binary-quinary decade counter, the neon lamp circuit connected across the collector combination of which the quinary transistor is cut off and the binary transistor is conducting, has impressed thereacross a potential in excess of that impressed across other lamp circuits and sufficient to fire the corresponding lamp. As a consequence, the lamp of that circuit fires or lights, but the remaining lamps remain extinguished for lack of sufficient applied potential. In FIGURE 11, the potentials across the different lamp circuits at different times are shown at waves 638, 640, 642, 644, 646, 648, 650, 652, 654 and 656 wherein the respective peaks at times $t_0$, $t_1$, etc., represents potentials sufficiently great to fire corresponding lamps. In response to input pulses received at times $t_0$, $t_1$, etc., the lamps fire in order.

It is noted that since the transistors in the quinary section are successively cut off in response to each incoming pulse rather than each two incoming pulses as in the binary-quinary circuit, the lamp firing potential is derived at such cut off quinary transistor and the fired lamps appear in alternate manner as in FIGURE 8. The neon lamps in FIGURE 8 fire in the sequence 312′, 316′, 320′, 324′, 328′, 314′, 318′, 322′, 326′, and 330′.

In a manner similar to that shown in FIGURE 1, ten pins 0′ to 9′ are provided for obtaining a potential externally applicable for indicating the count of the circuit. The circuitry provided for these pins is the same as shown in FIGURE 1 with the exception that counterparts of the capacitors 402, 406, 410, 414 and 418 are omitted. The potentials derived at pins 0′ to 9′ are shown at 658, 660, 662, 664, 666, 668, 670, 672, 674, and 676 in FIGURE 10 wherein it is observed that each wave produces a minimum potential at a different instant of time. External circuitry may be connected to these pins to produce an indication of the count. It should be noted that pins 0′ to 9′ do not appear in orderly sequence but rather in alternate manner since the lamp firing potential is derived in a similar alternate manner.

A staircase output potential is derivable in the circuit of FIGURE 8 in a manner similar to that described with respect to FIGURE 1, wherein terminal 440′ is connected to collectors 126′, 128′, 130′ and 132′ through variable resistors 442′, 444′, 446′, 448′, and 454′. Terminal 440′ is also connected to collectors 22′ and 30′ through respective resistors 450′ and 452′. The output derived at terminal 440′ is shown graphically at 684 in FIGURE 10.

The resetting circuit 62′ of the quinary-binary decade counter shown in FIGURE 8 is a similar in construction and function to the resetting circuit 62 in FIGURE 1 and is effective in resetting the binary section with transistor 16′ cut off and 24′ conducting and quinary section resetting circuit 292′ is effective in the manner of circuit 292, to reset the quinary section with transistor 94′ cut off and the others conducting. In the case of binary section 10′, the resetting pulse is applied to the collector 30′ of transistor 24′ to render the same conducting in response to the positive resetting pulse applied thereto. The resetting pulse applied to the decade counter is effective to render transistors 18′ and 94′ cut off and all others conducting.

FIGURES 12, 13 and 14 show graphs representing values of potentials at different instants of time and appearing at different points in the circuit of FIGURE 8 when operated for reverse count. In FIGURE 12 the input pulses are indicated at 686, the potentials of quinary section collectors 126′, 128′, 130′, 132′ and 134′ at 688, 690, 692, 694, and 696, the potentials across neon lamp circuits of FIGURE 14 at 702, 704, 706, 708, 710, 712, 714, 716, 718 and 720, the potentials at pins 0′ to 9′ of FIGURE 13 at 722, 724, 726, 728, 730, 732, 734, 736, 738 and 740 and the staircase output potential at 742. Waves 625′ and 633′ represent, respectively, the potentials passing from collectors 126′ and 134′ through respective gates 602 and 604. It is observed in each of these figures that the count of the circuit progresses in reverse and that the lamp indicators and external output potentials accordingly are activated in reverse.

In quinary-binary counter circuit constructed as shown in FIGURE 8 and wherein the primed numbered elements are of the same values as corresponding elements in FIGURE 1, resistors 612 and 620 are 100K in value, capacitors 608, 610, 616, and 618 are 68 micro microfarads and each of diodes 606 and 614 is a 1N295, the circuit has been very satisfactorily operated at frequencies in excess of 120 kilocycles per second with forward and reverse gating and at frequencies of approximately 250 kilocycles per second without the reversing features. Accordingly, the quinary-binary counter circuit arrangement of this invention is advantageous over the binary-quinary counter circuit arrangement in that its frequency response with reverse gating is better. As another advantage of the quinary-binary counter circuit arrangement, the steps of the staircase output potential wave are larger in that they are of the order of ten volts total for ten steps. It is to be understood that in this embodiment of my invention as well as others herein described, the specific values of circuit elements are purely examples and that these elements may vary widely in accordance with my invention.

Figure 22:
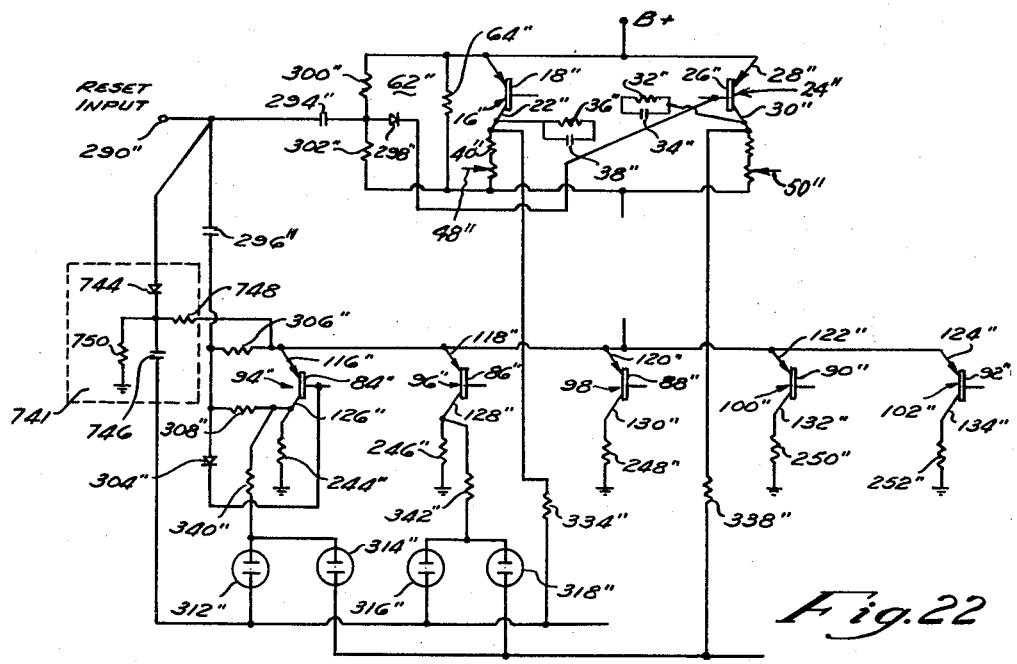
FIGURE 22 is a simplified schematic representation of a modified circuit for achieving reset in a binary-quinary decade counter circuit as shown in FIGURE 1.
Figure 23:
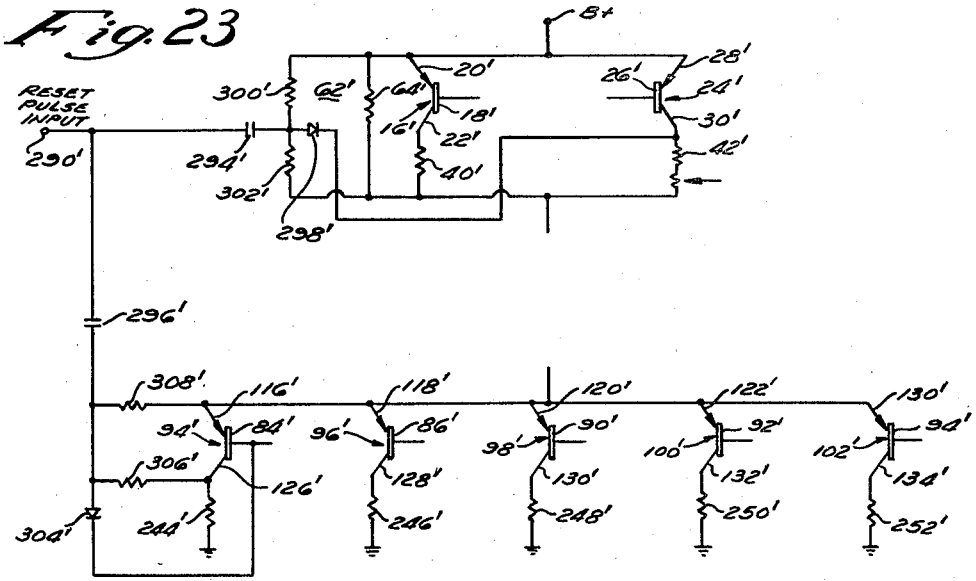
FIGURE 23 is a simplified schematic representation of the quinary-binary decade counter circuit shown in FIGURE 8 and including the essential circuit elements for resetting the counter to initial condition or zero count.

According to another modification of the invention the binary-quinary decade counter may include circuitry for resetting both binary and quinary sections as shown in simplified FIGURE 22 of the drawings. Similar elements performing similar functions to corresponding elements in FIGURES 1 and 21 of the drawings are designated by the same numbers with a double prime. In FIGURE 22, the binary reset circuit 62″ comprises a pair of resistors 300″ and 302″ serially connected between a source of B+ potential and a point of lower potential to form a potential divider for applying a potential bias to the positive terminal of a diode 298″ connected to the junction point of these resistors and to the base 26″ of the transistor 24″. A capacitor 294″ is interposed between reset input terminal 290″ and the junction between 300″ and 302″.

For achieving reset of the circuit transistors, reset input terminal 290″ is also coupled to the base 84″ of transistor 94″ through capacitor 296″ and diode 304″ in series and a potential bias is applied to the anode of diode 304″ by connection thereof to the junction of resistors 306″ and 308″ forming a potential divider. In accordance with a feature of this embodiment of my invention, reset terminal 290″ is also connected to lamps 312″, 316″, 320″, 324″ and 328″ through a gate 741 including a series arrangement of a diode 744, a capacitor 746 and a resistor 334″. A potential bias is applied to the cathode of diode 744 by the connection thereof to the junction between resistors 748 and 750 which in turn are connected between a source of positive potential and ground. In this circuit, the application of a positive reset pulse at terminal 290″ is effective to impress appropriate potentals to the bases 26″ and 84″ of transistors 24″ and 94″ and to the terminal of lamp 312 remote from its connection to resistor 340″. The effect of such a pulse is to render transistors 24″ and 94″ non-conducting and under the circumstances to raise the potential of the terminal of lamp 312″ remote from its connection to resistor 340″ sufficiently to produce a potential difference across the neon lamp 312″ sufficiently great to cause it to fire. The value of resistor 334″ interposed in the connection between lamp 312″ and collector 22″ of transistor 16″ is sufficiently high to render the effect of the reset pulse on transistor 16″ through its collector, negligible, but after reset, the potential of collector 22″ applied through this resistor to lamp 312″ is effective to maintain a potential difference across the lamp to maintain its firing. The gate circuit 741 thus, facilitates firing of the reset neon lamp by providing an increased firing potential. In case of marginal lamps, this feature minimizes erratic counter performance.

Figure 24:
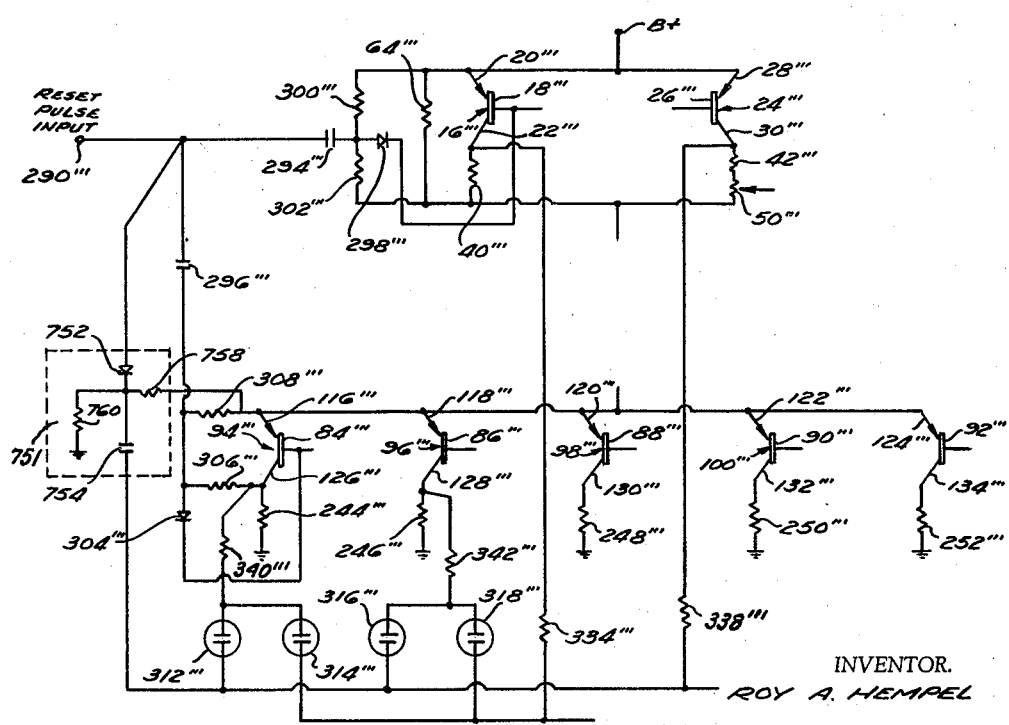
FIGURE 24 is a simplified schematic representation of a modified circuit for achieving reset in a quinary-binary decade counter circuit as shown in FIGURE 8.

The quinary-binary decade counter may be reset according to another modification of my invention as shown in FIGURE 24 of the drawings wherein elements corresponding to and performing functions similar to elements in FIGURE 8 are designated by the same number triple primed. Thus, reset circuit 62‴ is similar to reset circuit 62′ with the cathode of diode 298‴ connected to base 18‴ of transistor 16‴ rather than to the collector of transistor 24‴. Reset terminal 290‴ is connected to base 84‴ through capacitor 296‴ and diode 304‴, the anode of which is biased at a potential appearing at the junction of resistors 306‴ and 308‴ connected serially between emitter 116‴ and collector 126‴ of transistor 96‴. Reset terminal 290‴ is also connected to one terminal of each of neon lamps 312‴, 316‴, 320‴, 324‴ and 328‴ and through a gate circuit 751 including a diode 752 serially connected with a capacitor 754. The cathode of diode 752 which is connected to capacitor 754 is positively biased by a potential derived at the junction of resistors 758 and 760 serially connected between emitter 116‴ and ground. In a manner similar to gating circuit 741 in FIGURE 22, gating circuit 751 facilitates the firing of neon lamp 312‴ in response to a reset pulse applied to terminal 290‴. Collector 30‴ is connected through resistor 334‴ to one terminal of each of neon lamps 312‴, 316‴, 320‴, 324‴ and 328‴ to maintain firing of these lamps after initially fired and similarly, lamps 314‴, 318‴, 322‴, 326‴, and 330‴ are maintained fired, once initiated by the connection of one terminal of each to collector 22‴ through resistor 334‴.

Figure 25:
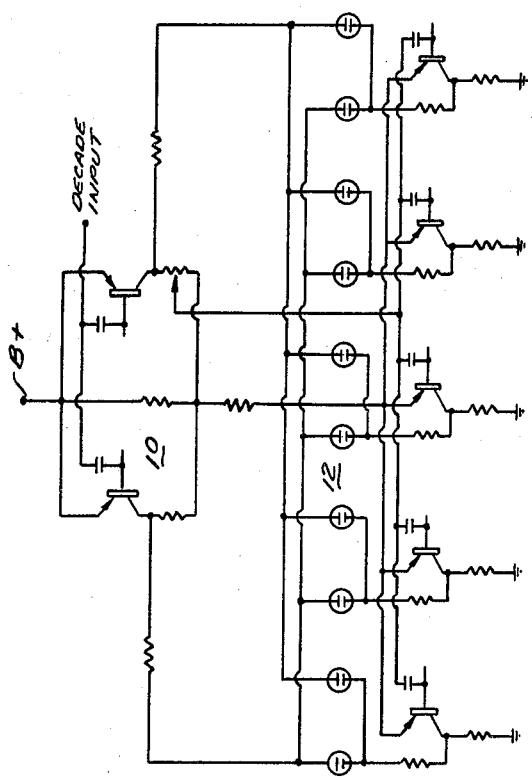
FIGURE 25 is a simplified schematic representation of components of a binary-quinary decade counter circuit of of a high potential type as shown in FIGURE 1.
Figure 26:
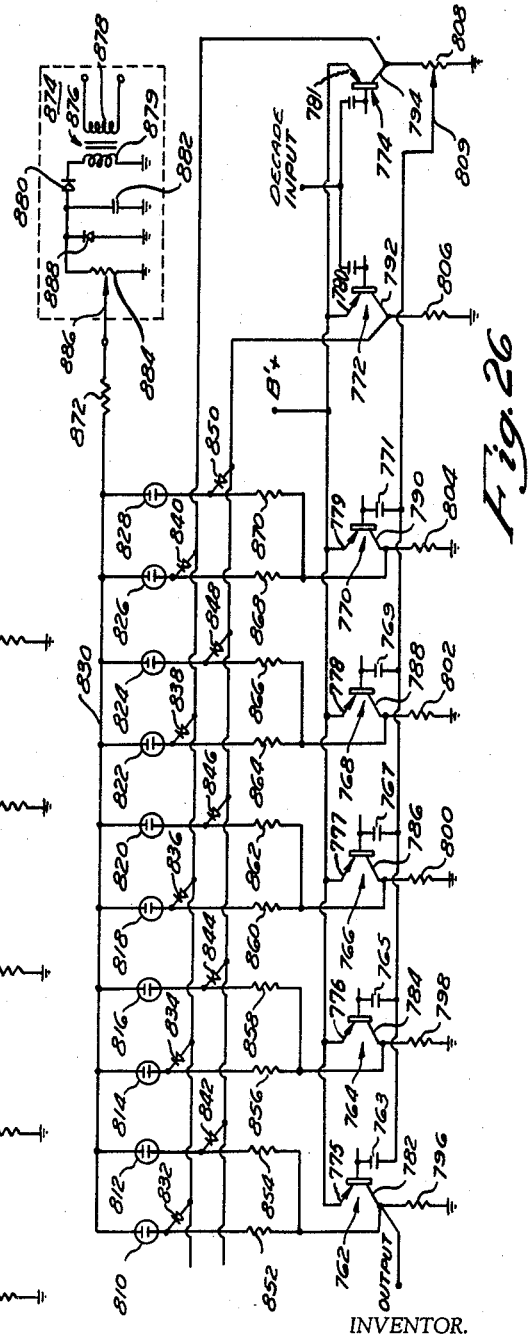
FIGURE 26 is a simplified schematic representation of components of a binary-quinary decade counter circuit having a modified neon lamp connection arrangement and power supply adapting the circuit for low potential operation.

In FIGURE 25 is a simplified schematic diagram of a binary-quinary decade counter circuit of the type shown in FIGURE 1 of the drawings which in the typical example hereinabove set forth may be operated at a B+ potential of 95 volts illustrating the general series circuit arrangement between a binary section 10 and a quinary section 12, the details of which are not set forth. FIGURE 26 is a simplified schematic diagram of a binary-quinary decade counter circuit according to still another embodiment of my invention, wherein in accordance with another important feature of my invention, the binary and quinary sections are arranged side by side or in a generally parallel circuit relationship. The structure and function of the individual circuits in each case is substantially the same but as described more fully hereinbelow, the circuit of FIGURE 26 is operable at lower potentials than are required in the circuit of FIGURE 25 with the B+ potential in FIGURE 26 being less than one third of the B+ potential necessary in FIGURE 25 under circumstances wherein the passive and active circuits are of the same values as corresponding elements in the circuit of FIGURE 1. In the operation of a counter circuit as shown in FIGURE 25, considerable potential swing at transistor collectors may be required in achieving firing and extinction of the neon lamps in the indicator circuit. In accordance with improvements incorporated in the circuit of FIGURE 26, this large potential swing is obviated and operation of the circuit is improved.

In FIGURE 26, the quinary section includes transistors 762, 764, 766, 768 and 770, the detailed intercoupling of which is not shown since it may be substantially as in the quinary circuits of the binary-quinary or quinary-binary circuits described hereinabove and the binary section includes transistors 772 and 774, the detailed intercoupling of which is not shown since it also may be substantially as in the aforedescribed binary circuits. In this circuit, a source of B+ potential is applied to the emitters 775, 776, 777, 778, 779, 780 and 781 of the seven transistors included therein and the collectors 782, 784, 786, 788, 790 and 794 are connected to respective resistors 796, 798, 800, 802, 804, 806 and potentiometer 808 the other ends of which are grounded. The movable arm 809 of potentiometer 808 is coupled to the bases of transistors 762, 764, 766, 768 and 770 through respective capacitors 763, 765, 767, 769 and 771. A neon indicator circuit including neon lamps 810, 812, 814, 816, 818, 820, 822, 824, 826 and 828 is provided wherein one terminal of each lamp is connected to a line 830 for applying a potential, derived in a manner more fully described hereinbelow, to the lamps. The remaining terminals of alternate lamps 810, 814, 818, 822 and 826 are connected to the collector 794 through respective diodes 832, 834, 836, 838 and 840 which have cathodes connected to the lamp terminal and anodes connected to collector 794. The remaining terminals of alternate lamps 812, 816, 820, 824 and 828 are connected to collector 792 through respective diodes 842, 844, 846, 848 and 850 which similarly have cathodes connected to the lamp terminals and anodes connected to the collector 792. Resistors 852 and 854 are connected between collector 782 and respective remaining terminals of lamps 810 and 812, resistors 856 and 858 are connected between collector 784 and respective remaining terminals of lamps 814 and 816, resistors 860 and 862 are connected between collector 786 and respective remaining terminals of lamps 818 and 820, resistors 864 and 866 are connected between collector 788 and respective remaining terminals of lamps 822 and 824 and resistors 868 and 870 are connected between collector 790 and respective remaining terminals of lamps 826 and 828.

A source of pulsating direct potential is applied to line 830 through resistor 872 from a rectifying circuit 874 which includes a transformer 876 with a primary winding 878 across which a source of alternating potential is applicable and a secondary 879 across which is connected a diode rectifier 880 and a filtering capacitor 882. The filtered potential is applied to a potentiometer 884, the movable arm 886 of which is connected to line 830 through resistor 872. A voltage regulating diode 888 preferably of the Zener type, is connected across the rectifier output for the purpose of regulating the output potential thereof.

In the rectifying circuit 874, capacitor 882 is preferably of such relatively low capacitance as to avoid complete filtering action and produce a pulsating direct potential in the output of the circuit whereby a pulsating direct potential of magnitude controlled by potentiometer 884, is applied to line 830. The maximum value of the pulsating direct potential of line 830 exceeds the firing potential of any of the lamps and the minimum value thereof is below the extinguishing of these lamps.

Purely as an example, values of circuit components which have given good performance in the embodiment of my invention shown in FIGURE 26 of the drawings are as follows:

| | |
|---|---|
| All diodes | 2N195. |
| All transistors | 2N135 or 2N113. |
| Resistors 796, 798, 800, 802, 804, 806 and 808 | 4.7K. |
| Resistors 852, 854, 856, 858, 860, 862, 864, 866, 868, 870 | 10K. |
| Resistor 872 | 82K. |
| All neon lamps | General Electric type Ne-2. |
| Transformer 876 supply potential | 115 volt, 60 cycle. |
| Rectifier output potential | Pulsating direct potential varying between approximately +25 and +75 volts. |

In the operation of the circuit of FIGURE 26, input pulses applied to the binary section bases are effective to shift the state of equilibrium in this circuit and every two input pulses into the binary produces an output pulse in the circuit of collector 794 which is applied to the quinary section bases. The quinary section, as hereinabove described with respect to other embodiments of invention, has five states of stable equilibrium in each of which a single transistor is cut off and the remaining four are conducting. As the successive input pulses are applied to this counter circuit, the indicator lamps successively fire to indicate the number of input pulses received, or in other words, the circuit count. Each lamp is influenced by the potential appearing at a quinary circuit transistor collector and the potential at the collector of a binary circuit transistor and the lamp influenced by the cut off transistors of these sections is uniquely fired. To this end, it is noted that the potentials at the collectors of these transistors are at a minimum at cut off condition and a maximum positive value at full conduction and that in response to the shifts in the several states of equilibrium of the two sections, the lamps are successively influenced by different combinations of cut off transistors to apply a minimum potential to the remaining terminals of the lamps. As an example, in the reset condition of the circuit with transistors 762 and 774 cut off and the remainder conducting, the potential of collector 782 is applied to the terminals of lamps 810 and 812 remote from line 830 whereby each lamp in the absence of the influence of the binary section would be inclined to fire. Since transistor 772 is conducting under these circumstances, the potential of collector 792 is at its maximum positive value and is applied to the terminal of lamp 812 remote from line 830 through diode 842 decreasing the potential across lamp 812 and extinguishing it. The potential of collector 794 on the other hand, is at its minimum and such minimum is applied to the other terminal of lamp 810 through diode 832. Accordingly, the potential difference across lamp 810 is greater than the potential difference across lamp 812 and under this proportioning of elements and potentials in the circuit, lamps 810 fires and lamp 812 remains extinguished. In this state of the transistors, the positive pulsating direct potential applied to the lamp 810 from line 830, causes the lamp to fire and extinguish it at a rate equal to the frequency of the pulsations on the line. In the case wherein the usual 115 volt 60 cycle per second power source is applied to transformer 876, the half wave rectifier 880 produces 60 pulsations per second and the lamp fires and extinguishes at this rate. However, due to the persistance of human vision, the lamps appear to be fired continuously under such circumstances. Lamps 814 through 828 remain off because transistors 764 through 770 are conducting with collectors at high positive potential and this is applied the neon leads connected to diodes which together with line 830 potential, decreases the potentials across these lamps and they remain "off."

In response to a first pulse applied to the input to the binary circuit, transistor 774 is rendered conducting and transistor 772 is cut off while the state of the quinary section remains the same. Under these circumstances, the maximum potential of collector 794 is applied to the terminal of lamp 810 remote from line 830 whereby lamp 810 is extinguished and lamp 812 fires. In a similar manner, each of the other lamps is fired in proper sequence in response to input pulses applied to the circuit.

Provision is made for maintaining a substantially constant pulsating direct potential at the output of circuit 874 to insure against erratic firing of the lamps by voltage regulating diode 888. This diode is non-conductive at potentials applied thereacross from transformer 876 less than certain range and is conductive at potentials in excess of such value. Accordingly, in response to application of such excessive potentials the diode conducts to reduce the potential of the output of the rectifying circuit.

In the circuit of FIGURE 26 certain advantages accrue by reason of the lower B+ potentials required to operate the circuit and the simplified scheme for obtaining the necessary potential swing to fire and extinguish the neon lamps. In the latter instance, the pulsating direct potential has maximum and minimum values greater and lower, respectively, than firing and extinguishing values of the lamps and by reason of the simplified circuitry for obtaining such potentials certain important advantages of simplicity and efficiency are possessed in this circuit.

In the herein described embodiments of invention the transistors have been set forth as being of the P-N-P type wherein the bases are of N-type semiconducting material and the emitters and collectors are of P-type semiconducting material. It is to be understood, however, that transistors of the N-P-N type wherein the bases are of P-type semiconducting material and the emitters and collectors are of N-type semiconducting material may be employed in these circuits with diodes reversed and supply potentials made negative instead of positive and other relatively minor modifications.

Having thus described this invention in such full, clear, concise and exact terms as to enable any person skilled in the art to which it pertains, to make and use the same and having set forth the best mode contemplated of carrying out this invention, I state that the subject matter which I regard as being my invention is particularly pointed out and distinctly claimed in what is claimed, it being understood that equivalents or modifications of or substitutions for parts of the above specifically described embodiment of the invention may be made without departing from the scope of the invention as set forth in what is claimed.

What I claim as new and desire to secure by Letters Patent of the United States is:

1. An electronic counter circuit comprising a pair of active circuit elements each having a control electrode and an output electrode being intercoupled to form a bi-stable circuit section having two states of stable equilibrium in each of which a different one of said active circuit elements is conducting and the other is substantially cut off, said bi-stable circuit section producing a pulse at said output electrode in response to a change in the state of equilibrium thereof, input circuit means coupled to the control electrodes of said elements for applying input pulses thereto, five further active circuit elements each having a control electrode and an output electrode, the control electrodes and output electrodes of said further active circuit elements being intercoupled to form a multi-stable circuit section having five states of stable equilibrium in each of which a different active circuit element is substantially cut off and the others are conducting, means interconnecting the output electrode of each active circuit element of said multi-stable circuit section to the control electrode of each other active circuit element of said multi-stable circuit section, means including a pair of diodes connecting the output electrode of each active circuit element in said multi-stable circuit section to the control electrode of two other active circuit elements in said multi-stable circuit section, biasing means for selectively applying a biasing potential to one of the diodes of said pair of diodes, means including a second pair of diodes each connecting the output electrode of one of the active circuit elements of said bi-stable circuit section to the control electrodes of all of the active circuit elements in said multi-stable circuit section, and biasing means for selectively biasing one of said second pair of diodes to prevent conduction therethrough.

2. An electronic counter circuit comprising: a binary section having a pair of transistors, each of said transistors having a control electrode and an output electrode, means interconnecting said transistors to provide a bistable circuit responsive to input pulses applied thereto to alternate stable states of conduction; a quinary section having five transistors each having a control electrode and an output electrode, one of said transistors in said quinary section being in a non-conduction state and the remainder of said transistors in said quinary section being in a conducting state, means interconnecting the output electrode of each transistor of said quinary section to the control electrode of each other transistor of said quinary section through a resistor, means including a pair of diodes connecting the output electrode of each transistor in said quinary section to the control electrode of two other transistors in said quinary section, biasing means for selectively applying a biasing potential to one of the diodes of said pair of diodes; means including a second pair of diodes each connecting the output electrode of one of the transistors of said binary section to the control electrodes of all of the transistors in said quinary section; and biasing means for selectively biasing one of said second pair of diodes to prevent conduction therethrough.

References Cited by the Examiner

UNITED STATES PATENTS

| | | | |
|---|---|---|---|
| 2,485,825 | 10/49 | Grosdoff | 235-92 |
| 2,665,845 | 1/54 | Trent | 235-92 |
| 2,843,320 | 7/58 | Chisholm | 235-92 |
| 2,851,220 | 9/58 | Kimes | 235-92 |
| 2,869,000 | 1/59 | Bruce | 307-88.5 |
| 2,877,357 | 3/59 | Pearsall et al. | 307-88.5 |
| 2,903,676 | 9/59 | Ostendorf | 307-88.5 |
| 2,907,898 | 10/59 | Clark | 307-88.5 |
| 2,910,596 | 10/59 | Carlson | 307-88.5 |
| 2,931,922 | 4/60 | Tubinis | 307-88.5 |
| 2,933,620 | 4/60 | Chaang Huang | 307-88.5 |
| 2,933,622 | 4/60 | Clark | 307-88.5 |
| 3,005,917 | 10/61 | Hofmann | 307-88.5 |
| 3,048,711 | 8/62 | Hofmann | 307-88.5 |

OTHER REFERENCES

"Decade Counter Employs Silicon Transistors," by Krenitsky, from "Electronics," vol. 28, No. 8, August 1955, pp. 112–113.

ARTHUR GAUSS, *Primary Examiner*.

LEO SIMLEW, WALTER W. BURNS, JR., *Examiners*.